US010694437B2

(12) United States Patent
Jorgovanovic

(10) Patent No.: US 10,694,437 B2
(45) Date of Patent: Jun. 23, 2020

(54) WIRELESS DEVICE CONNECTION HANDOVER

(71) Applicant: Amazon Technologies, Inc., Seattle, WA (US)

(72) Inventor: Milos Jorgovanovic, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/254,308

(22) Filed: Jan. 22, 2019

(65) Prior Publication Data

US 2020/0053612 A1 Feb. 13, 2020

Related U.S. Application Data

(63) Continuation-in-part of application No. 16/212,269, filed on Dec. 6, 2018, which is a continuation-in-part (Continued)

(51) Int. Cl.
*H04W 36/00* (2009.01)
*H04M 1/725* (2006.01)
(Continued)

(52) U.S. Cl.
CPC ......... *H04W 36/03* (2018.08); *H04M 1/7253* (2013.01); *H04W 4/80* (2018.02); *H04W 76/15* (2018.02)

(58) Field of Classification Search
CPC ....... H04W 36/03; H04W 76/15; H04W 4/80; H04M 1/7253
(Continued)

(56) References Cited

U.S. PATENT DOCUMENTS

2010/0195539 A1 8/2010 Yuefang
2011/0054907 A1 3/2011 Chipchase et al.
(Continued)

OTHER PUBLICATIONS

The Examiner's attention is hereby drawn to the specification and file history of co-pending U.S. Appl. No. 15/923,473, entitled "Wireless Devece Connection Handover", filed Mar. 16, 2018, which may contain information relevant to the present application.
(Continued)

*Primary Examiner* — Eugene Yun
(74) *Attorney, Agent, or Firm* — Pierce Atwood LLP

(57) ABSTRACT

A system and method includes a first audio-output device (e.g., a primary wireless in-ear device) connected to a second audio-output device (e.g., a secondary wireless in-ear device) using a first wireless connection. The first audio-output device is also connected to a third device (e.g., a smartphone or smart watch) using a second wireless connection. When the first and second audio-output devices exchange roles as primary and secondary, they first disconnect the second wireless connection and establish a third wireless connection between the second device and the third device. The first audio-output device sends packets stored thereon to the second audio-output device; the second audio-output device outputs audio corresponding to these packets before outputting audio corresponding to packets received from the third device.

20 Claims, 21 Drawing Sheets

Related U.S. Application Data of application No. 15/923,473, filed on Mar. 16, 2018, now Pat. No. 10,485,049.

(60) Provisional application No. 62/586,419, filed on Nov. 15, 2017.

(51) Int. Cl.
*H04W 76/15* (2018.01)
*H04W 4/80* (2018.01)

(58) Field of Classification Search
USPC .......................................................... 455/41.2
See application file for complete search history.

(56) References Cited

U.S. PATENT DOCUMENTS

| | | |
|---|---|---|
| 2011/0250840 A1 | 10/2011 | Lee et al. |
| 2012/0258661 A1 | 10/2012 | Masahiro |
| 2013/0316642 A1 | 11/2013 | Newham |
| 2015/0215719 A1 | 7/2015 | Turgul |
| 2015/0312862 A1 | 10/2015 | Pei |
| 2016/0219358 A1 | 7/2016 | Shaffer et al. |
| 2017/0048631 A1 | 2/2017 | Kwon et al. |
| 2017/0164089 A1 | 6/2017 | Lee et al. |
| 2017/0264987 A1 | 9/2017 | Hong et al. |
| 2017/0289277 A1 | 10/2017 | Lee et al. |
| 2018/0338197 A1 | 11/2018 | Jeong et al. |
| 2019/0124433 A1* | 4/2019 | Jo .................... H04R 1/1025 |

OTHER PUBLICATIONS

The Examiner's attention is hereby drawn to the specification and file history of co-pending U.S. Appl. No. 16/212,269, entitled "Wireless Devece Connection Handover", filed Dec. 6, 2018, which may contain information relevant to the present application.

The Examiner's attention is hereby drawn to the specification and file history of co-pending U.S. Appl. No. 15/923,645, entitled "Wireless Devece Connection Handover", filed Mar. 16, 2018, which may contain information relevant to the present application.

* cited by examiner

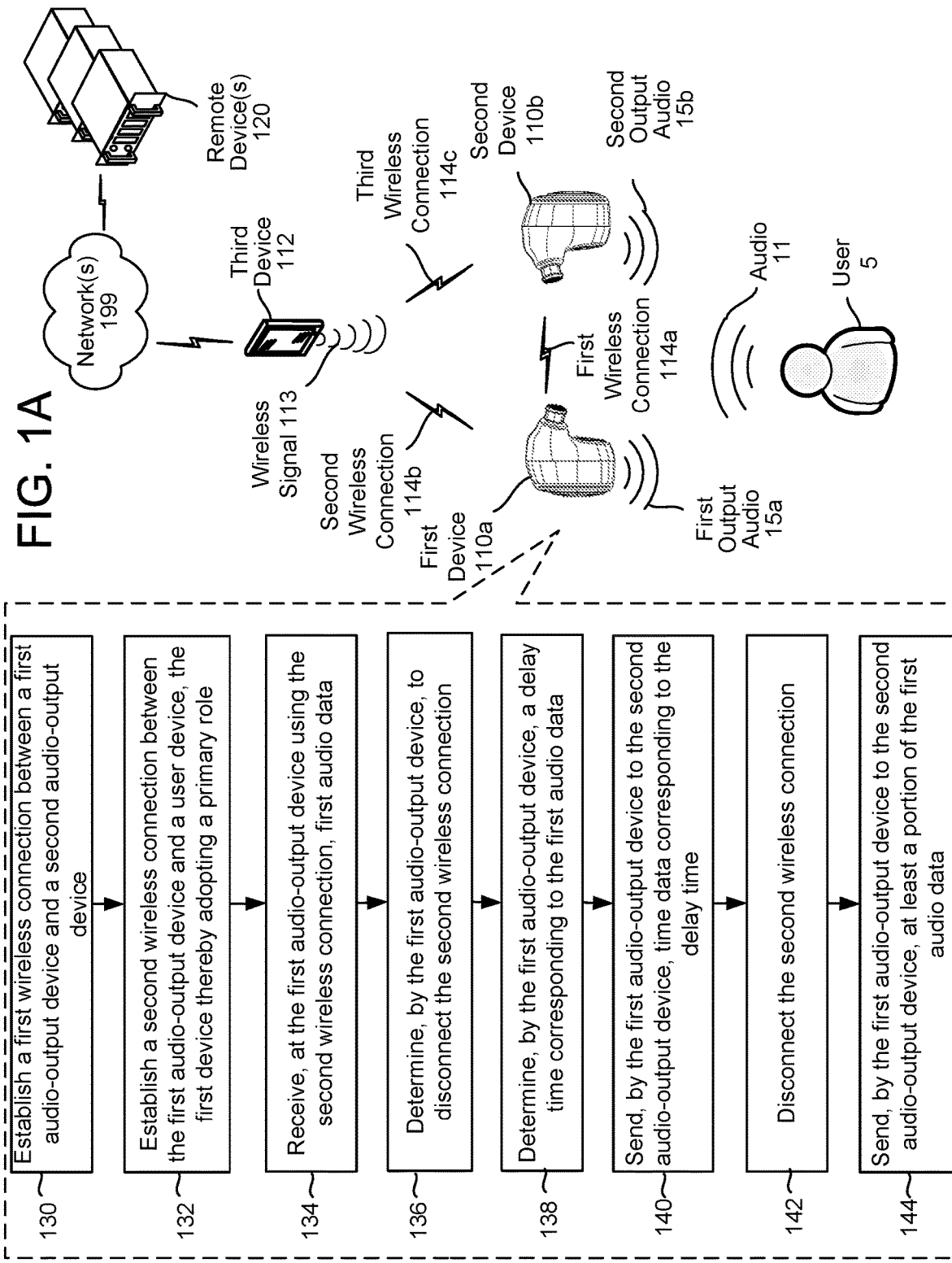

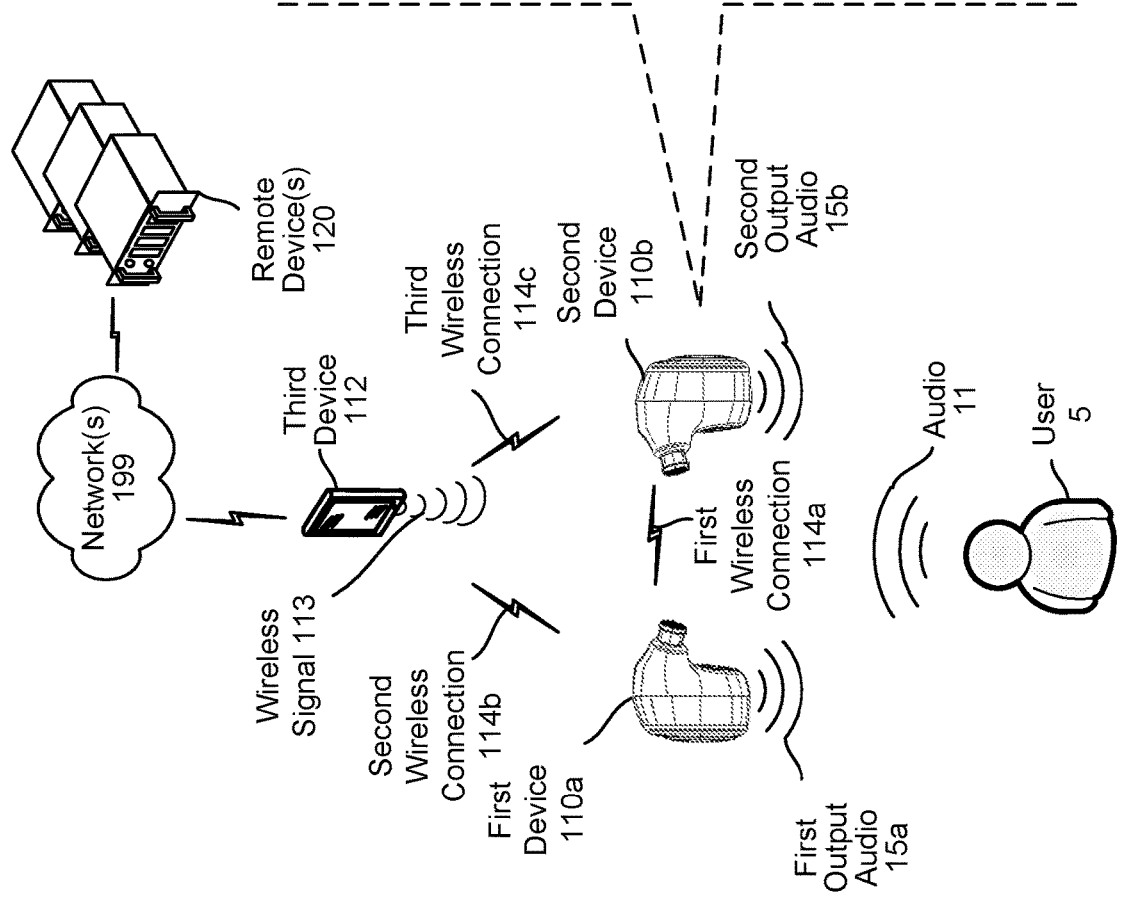

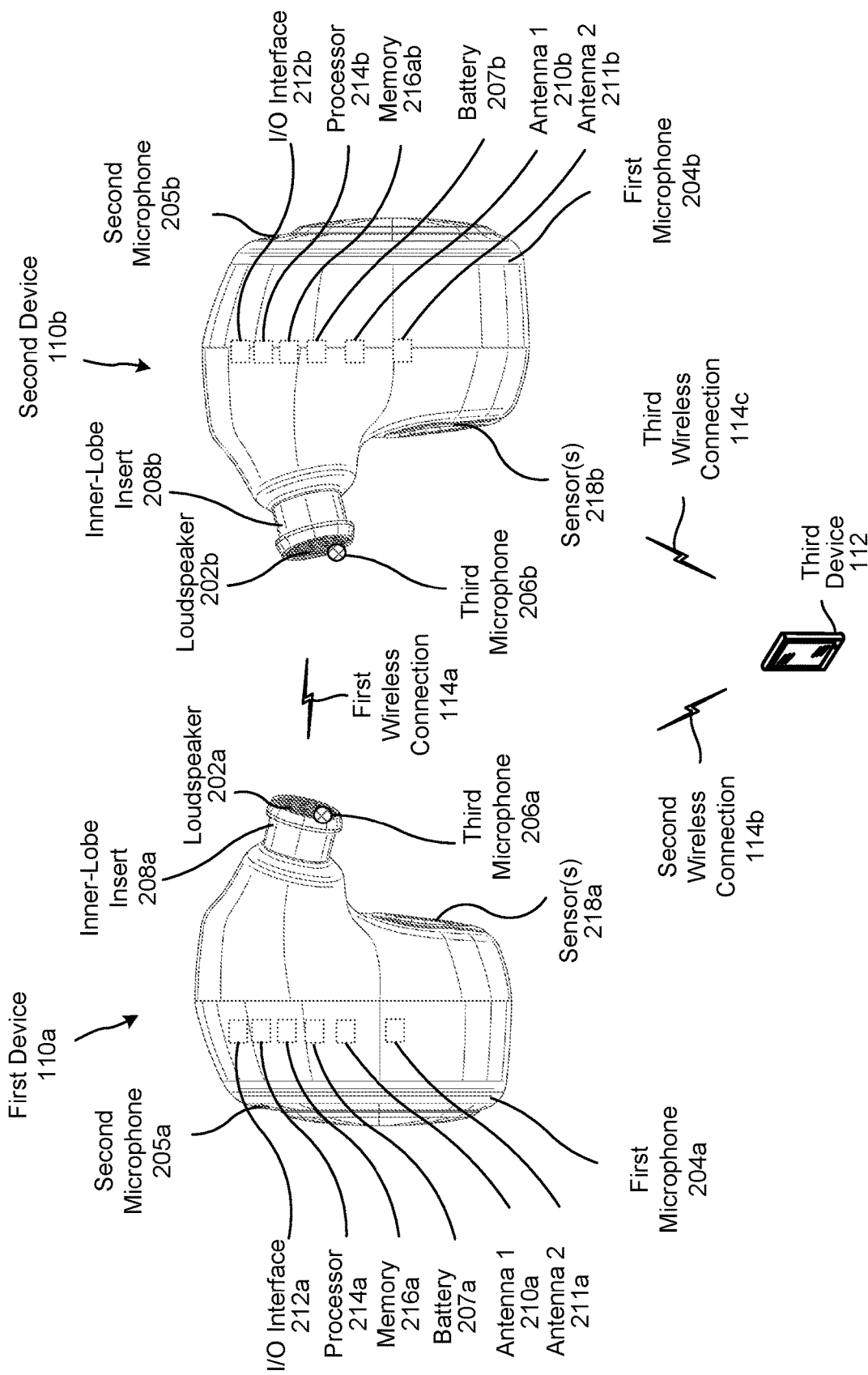

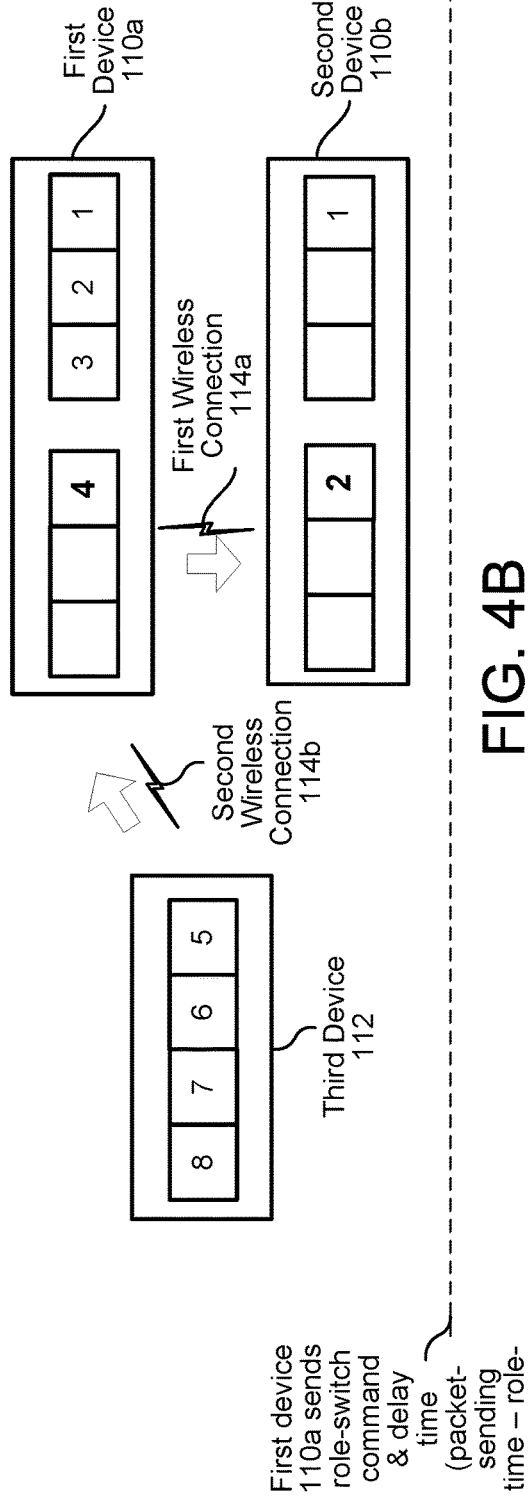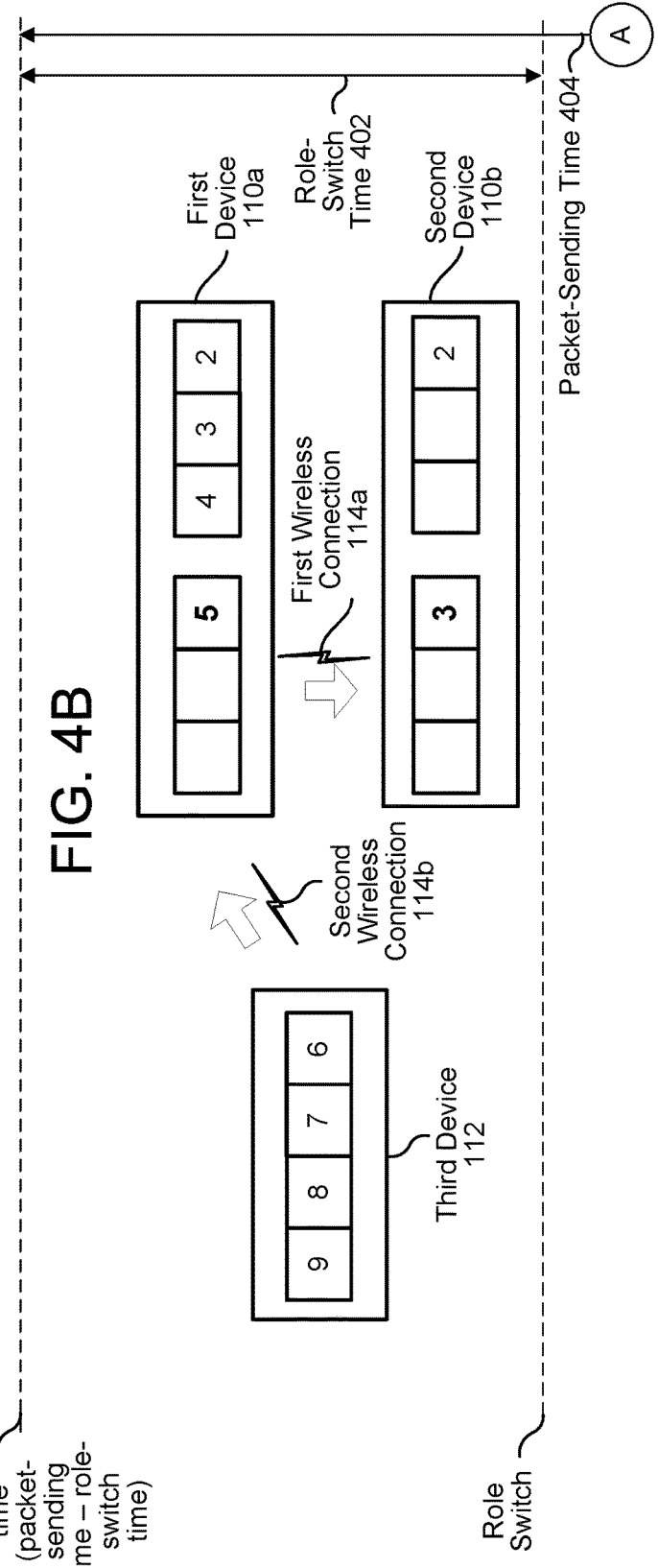

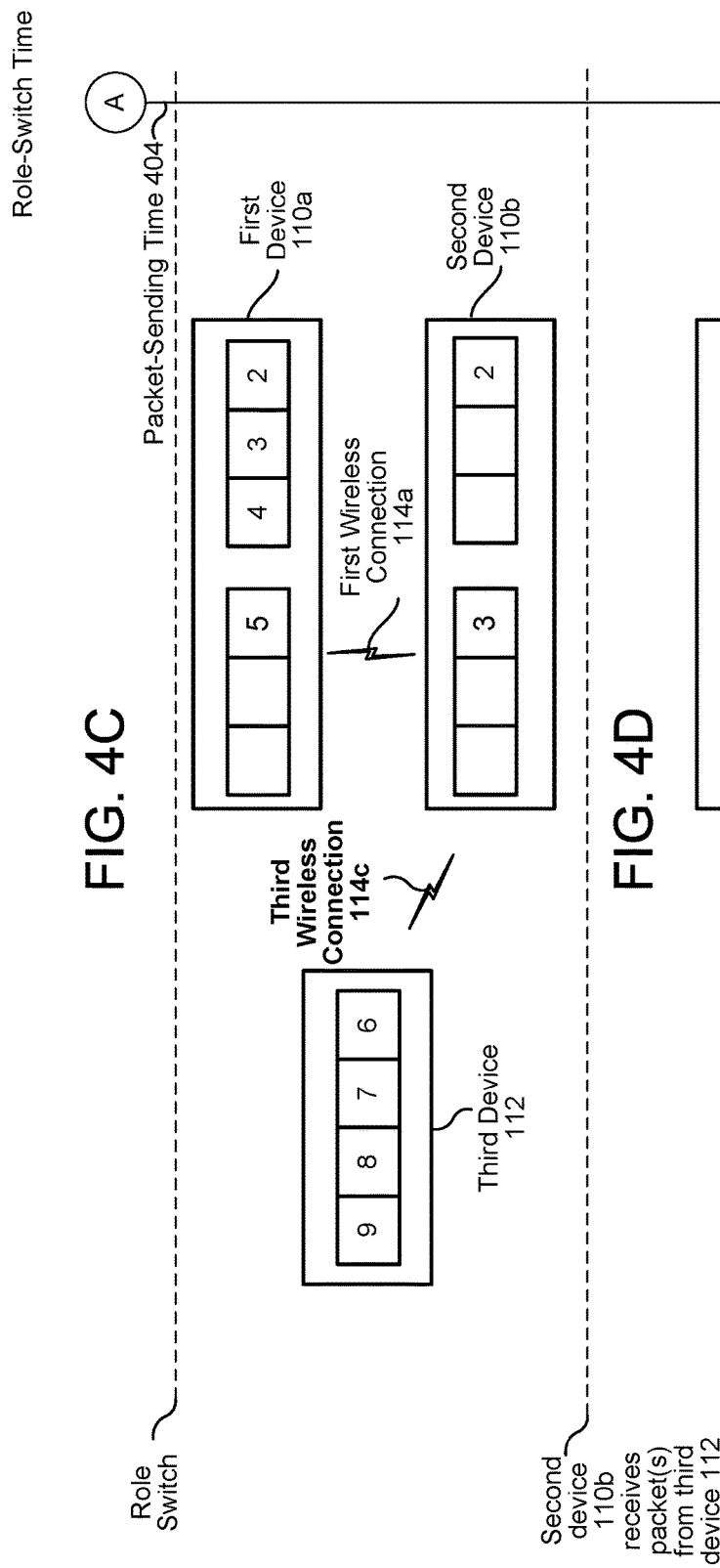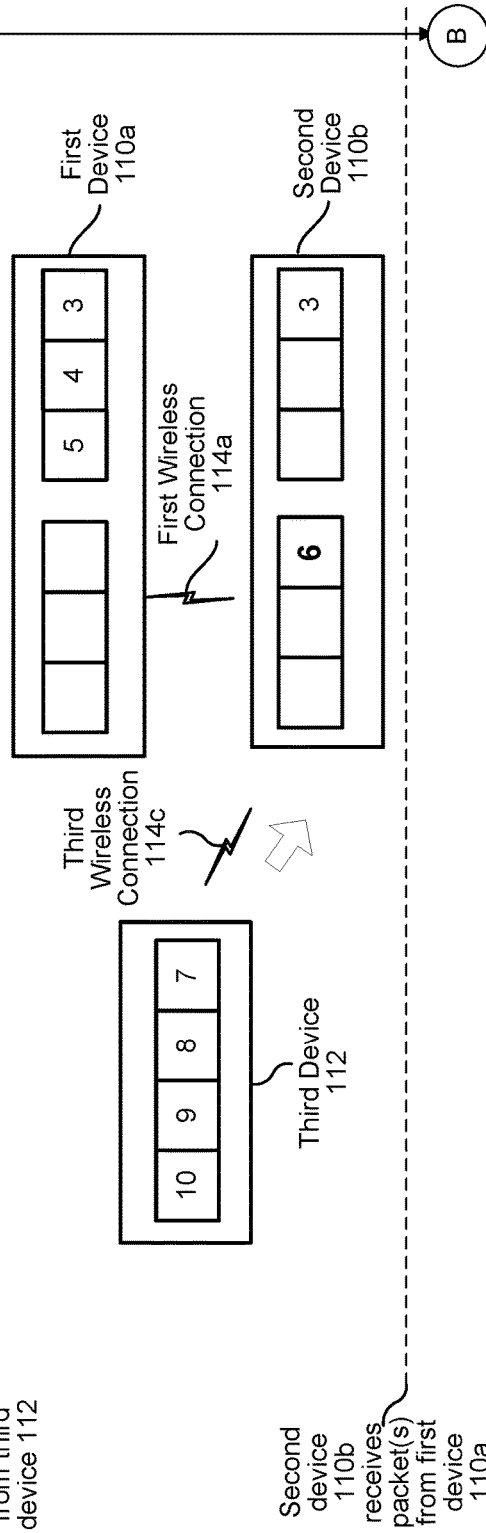

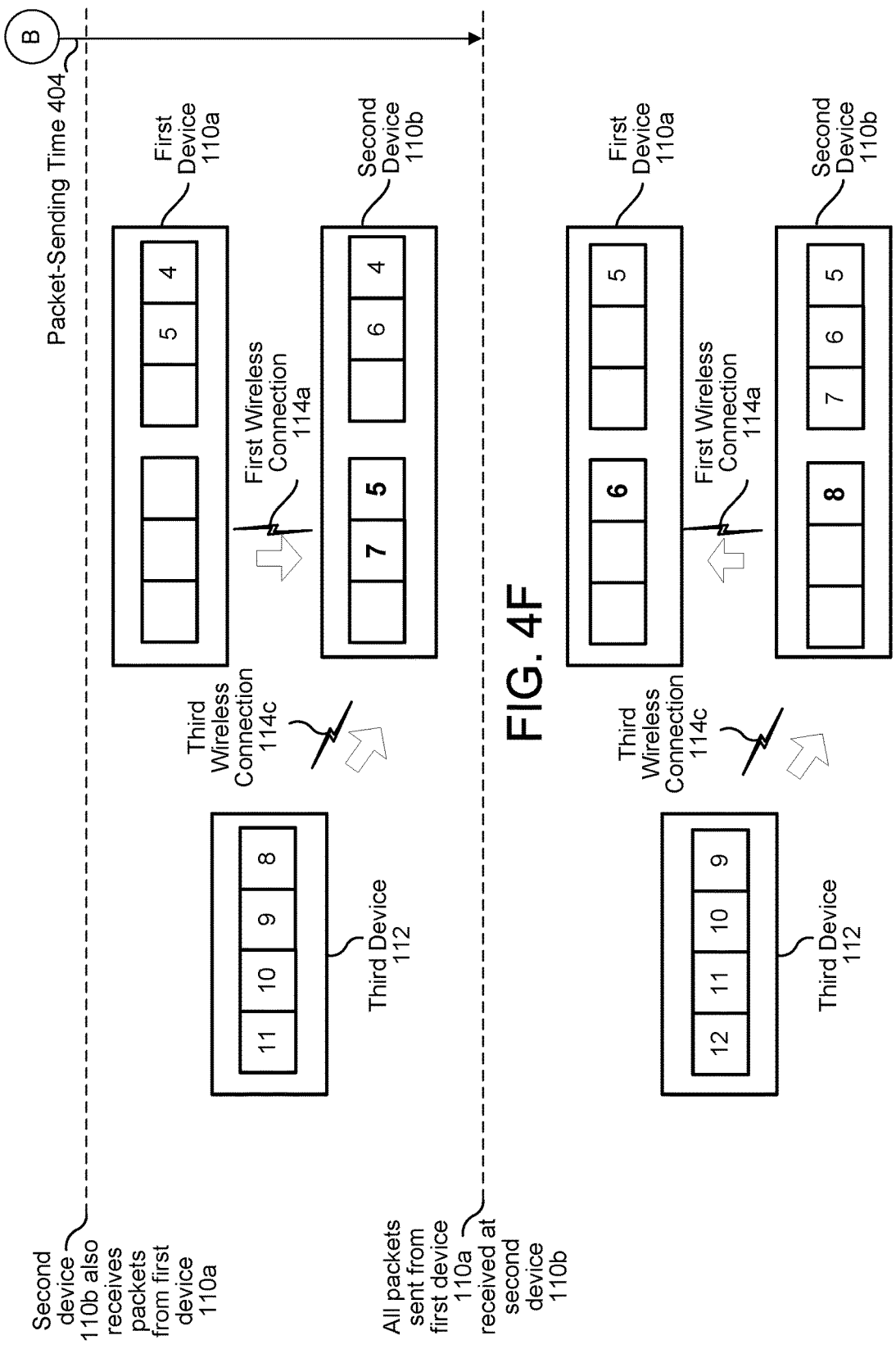

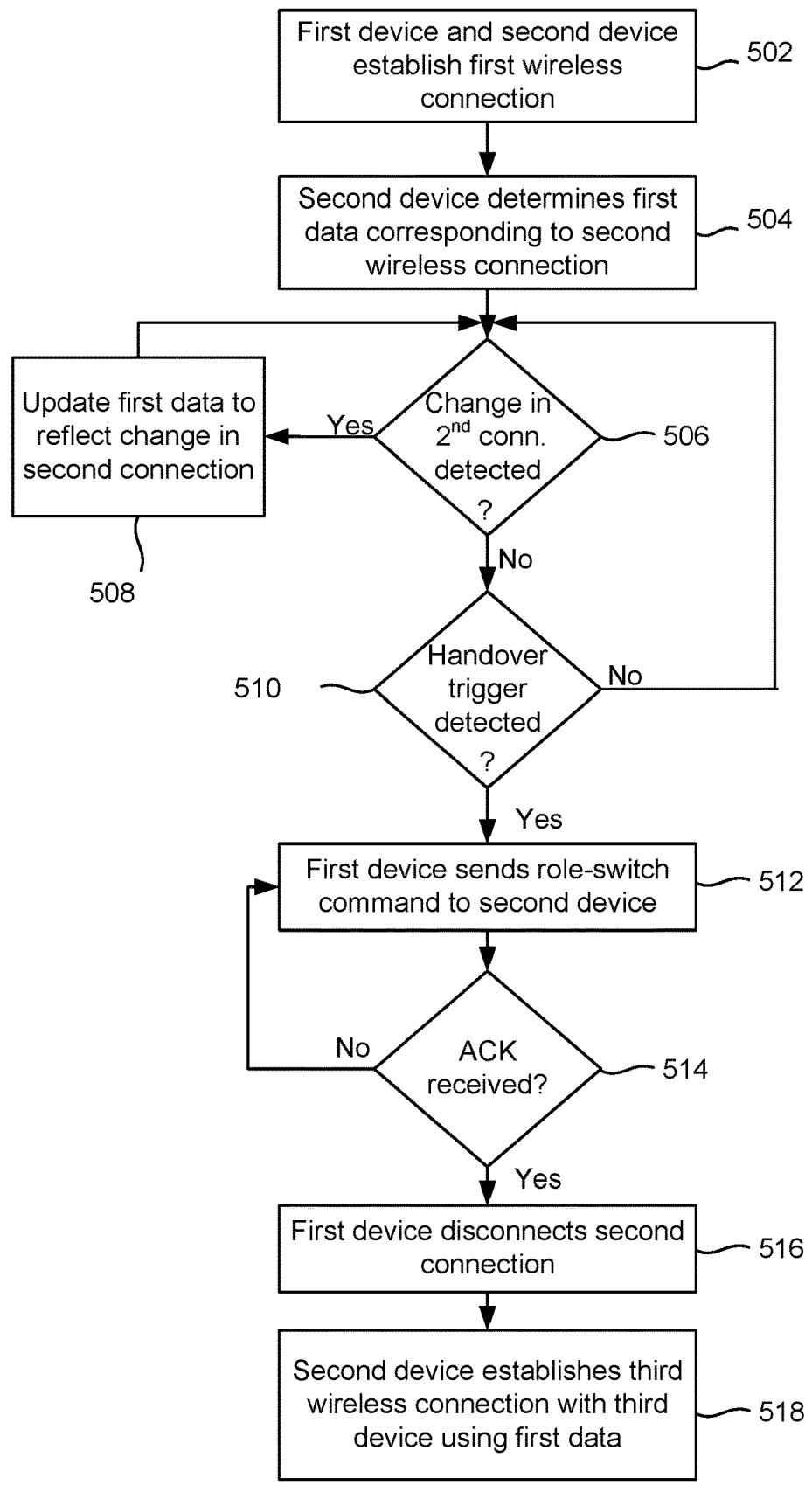

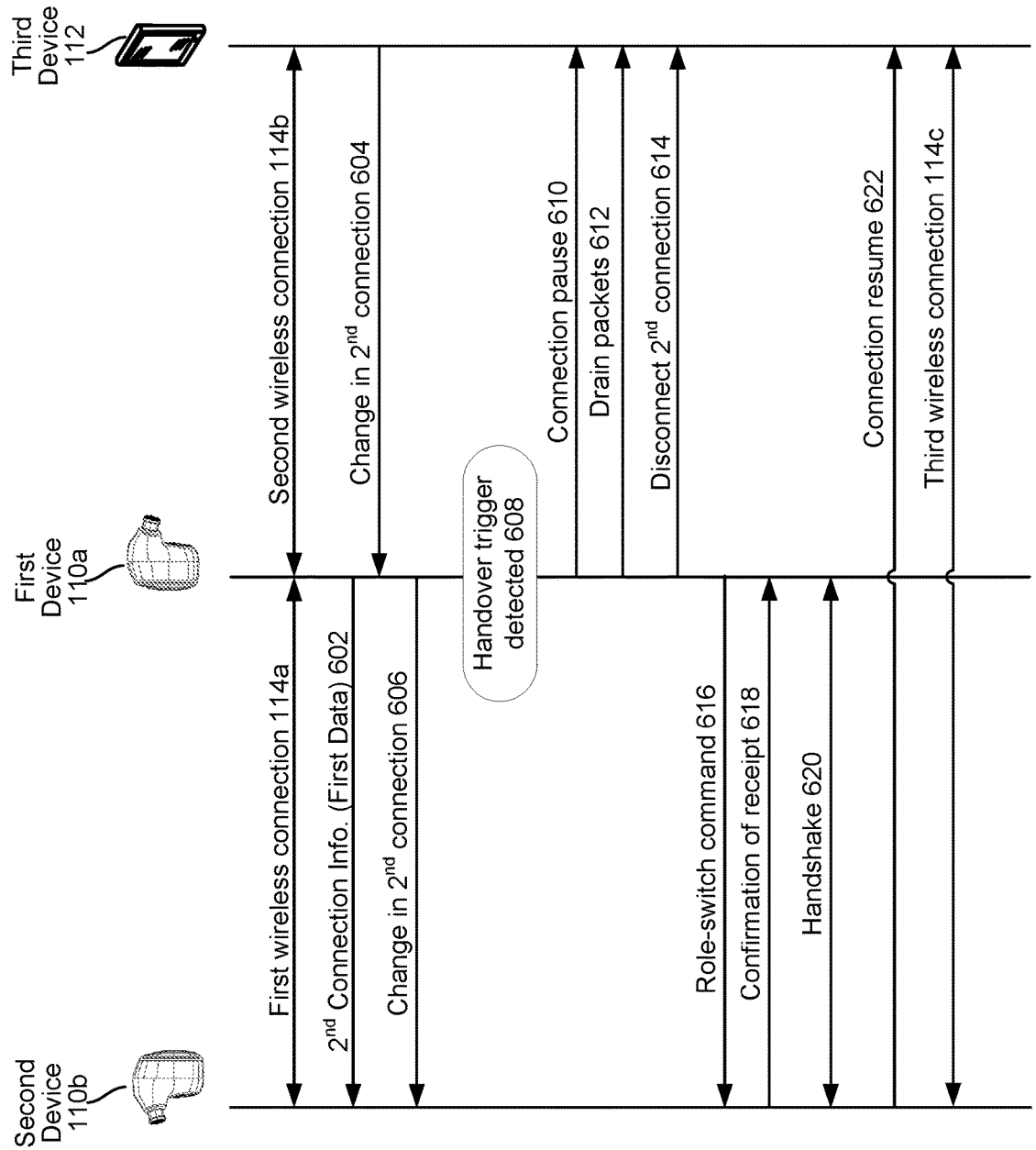

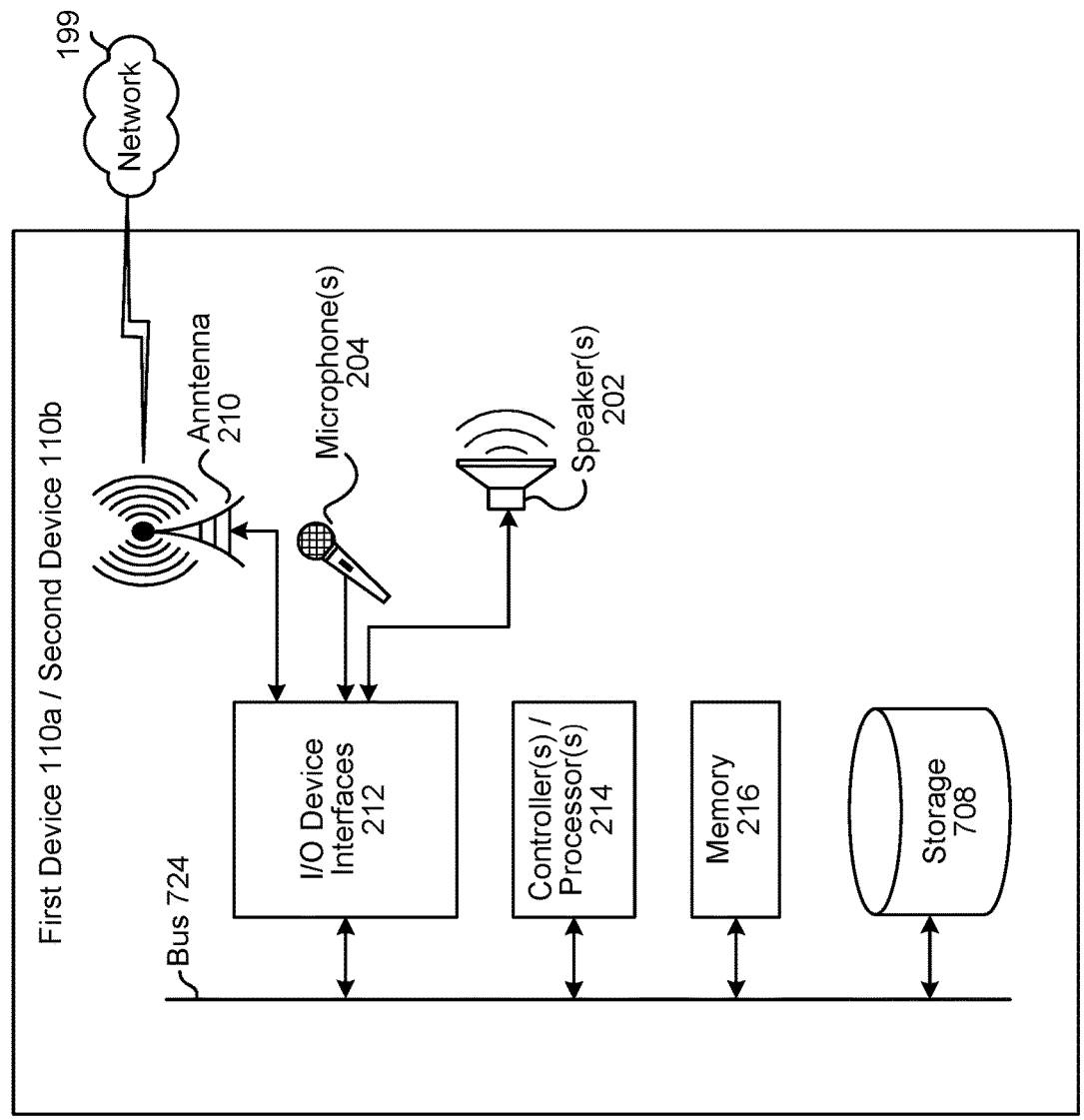

WIRELESS DEVICE CONNECTION HANDOVER

CROSS-REFERENCE TO RELATED APPLICATION

This application is a continuation-in-part of, and claims the benefit of priority of, U.S. Non-Provisional patent application Ser. No. 16/212,269, filed Dec. 6, 2018 and entitled "WIRELESS DEVICE CONNECTION HANDOVER," in the names of Ganesh Batta, et al., which is a continuation-in-part of, and claims the benefit of priority of, U.S. Non-provisional patent application Ser. No. 15/923,473, filed Mar. 16, 2018 and entitled "WIRELESS DEVICE CONNECTION HANDOVER," in the names of Ganesh Batta, et al., which claims the benefit of priority of U.S. Provisional Patent Application No. 62/586,419 and entitled "WIRELESS DEVICE CONNECTION HANDOVER," filed Nov. 15, 2017, in the names of Ganesh Batta, et al. The above applications are herein incorporated by reference in their entirety.

BACKGROUND

Wireless audio audio-output devices, such as earbuds, headphones, or loudspeakers, may be used to communicate wirelessly with a user device, such as a smartphone, smartwatch, or similar device, and with each other. The wireless audio-output devices may be used to output audio sent from the user device, such as music, as part of two-way communications, such as telephone calls, and/or to receive audio for speech recognition. Speech-recognition systems have progressed to the point at which humans are able to interact with computing devices using their voices. Such systems employ techniques to detect when speech is occurring and to identify the words spoken by a human user based on the received audio input. Voice-activity detection, speech recognition, and natural-language understanding processing techniques enable speech-based user control of a computing device to perform tasks based on the user's spoken commands. The combination of voice-activity detection, speech recognition, and/or natural-language understanding processing techniques is referred to herein as speech processing. Speech processing may also involve converting a user's speech into text data, which may then be provided to various text-based software applications.

BRIEF DESCRIPTION OF DRAWINGS

For a more complete understanding of the present disclosure, reference is now made to the following description taken in conjunction with the accompanying drawings.

FIGS. 1A and 1B illustrate a system configured to handover a wireless connection according to embodiments of the present disclosure.

FIGS. 2A, 2B, and 2C are conceptual diagrams of components of a wireless connection system according to embodiments of the present disclosure.

FIGS. 4A-4F illustrate data flows during wireless connection handover according to embodiments of the present disclosure.

FIGS. 5A-5G illustrate process flows for wireless handover according to embodiments of the present disclosure.

FIG. 6 illustrates a data flow relating to wireless handover according to embodiments of the present disclosure.

FIG. 7 is a block diagram conceptually illustrating example audio devices according to embodiments of the present disclosure.

DETAILED DESCRIPTION

Figure 2C:
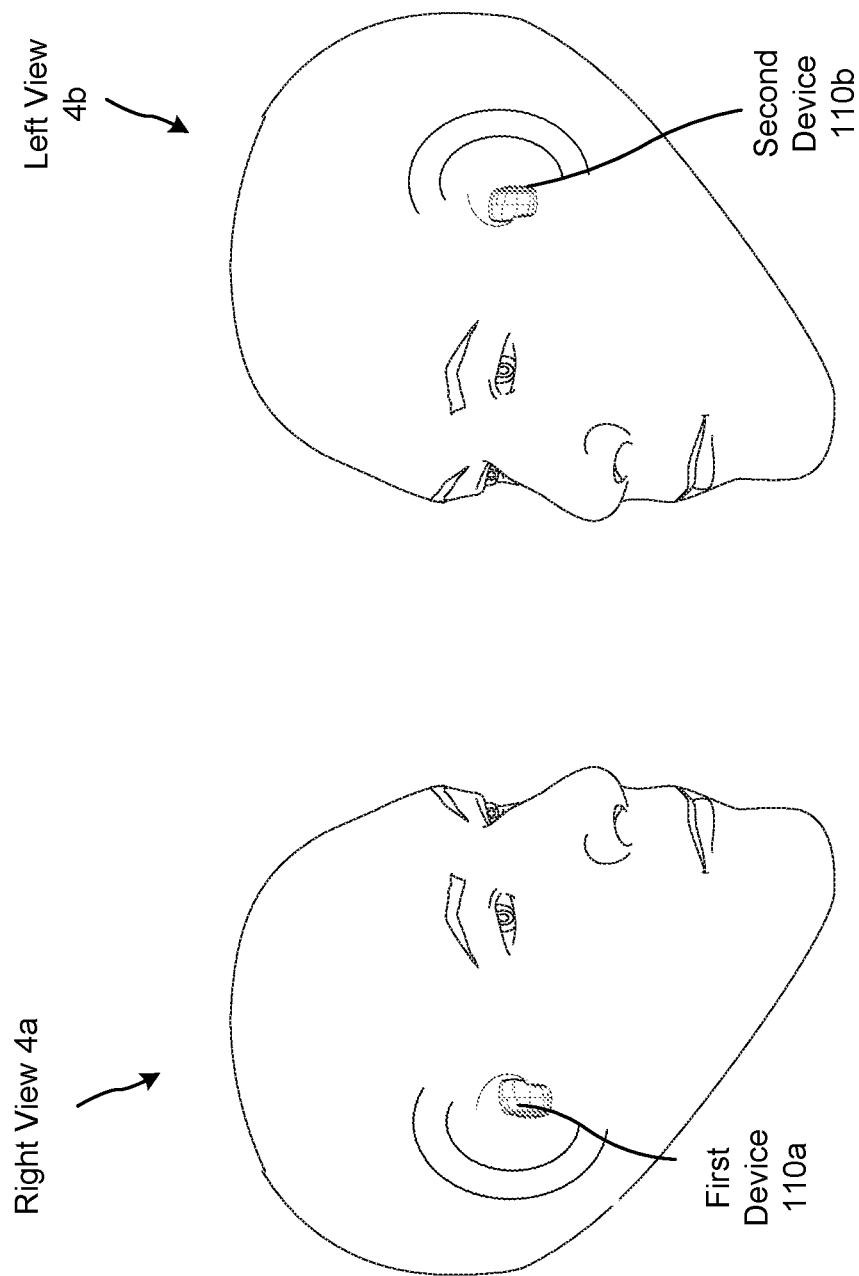

Some electronic devices may include an audio-based input/output interface. In certain situations, a user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a loudspeaker, for outputting audio that in some embodiments responds to and/or prompts for the voice input.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "audio-output devices" may refer to any audio input/output devices and includes headsets, earphones, earbuds, loudspeakers, or any similar device. For added convenience, the user may choose wireless headphones, which communicate with the device—and optionally each other—via a wireless connection, such as Bluetooth, WI-FI, near-field magnetic induction (NFMI), LTE, or any other type of wireless connection.

In the present disclosure, for clarity, in-ear audio-output devices that communicate with both a third device and each other may be referred to as "earbuds" or "wireless earbuds," but the term "earbud" does not limit the present disclosure to any particular type of wired or wireless headphones. The present disclosure may further differentiate between a "right in-ear device," meaning an in-ear device disposed in or near a right ear of a user, and a "left in-ear device," meaning an in-ear device disposed in or near a left ear of a user. A "primary" in-ear device communicates with both a "secondary" in-ear device, using a first wireless connection (such as a Bluetooth connection); the primary in-ear device further communicates with a third device (such as a smartphone, smart watch, or similar device) using a second connection (such as a Bluetooth connection). The secondary in-ear device communicates only with the primary in-ear device and does not communicate directly with the smartphone; any communication therewith passes through the primary in-ear device via the first wireless connection. In some embodiments, the primary in-ear device is a central or master Bluetooth device and the secondary in-ear device is a peripheral or slave Bluetooth device.

In the present disclosure, the primary in-ear device may be referred to as the "first device," the secondary in-ear device may be referred to as the "second device," and the smartphone or other user device may be referred to as the "third device." The primary and secondary in-ear devices may include similar hardware and software; in other instances, the secondary in-ear device contains only a subset of the hardware/software included in the primary in-ear device. If the primary and secondary in-ear devices include similar hardware and software, they may trade the roles of primary and secondary prior to or during operation as described herein. If an in-ear device takes on a primary role, it acts as the primary in-ear device as described above; if an in-ear device takes on a secondary role, it acts as the secondary in-ear device as described above. A first in-ear device may include hardware, software, firmware, or other configuration information that, upon power-on, reset, or other such event, causes the first in-ear device to initially assume the primary role. Similarly, the second in-ear device may include configuration information that causes the second in-ear device to initially assume the secondary role. As described herein, the first and second in-ear devices may each transition between the primary role and the secondary role one, two, or more times during use. The first, second, and/or third devices may communicate over a network, such as the Internet, with one or more server devices, which may be referred to as "remote device(s)."

Wireless in-ear devices, which may communicate wirelessly not only with a third device but with each other, may be more desirable and/or convenient to users because the in-ear devices do not require a wire or cord connecting them; such a cord may be distracting and/or uncomfortable. The lack of a connecting cord means, however, that each in-ear device requires its own power source, such as a battery. Such a power source is necessarily limited. Because the primary in-ear device maintains two wireless connections (one with the secondary in-ear device and one with the third device), it may consume power more quickly than the secondary in-ear device and therefore run lower on battery power more quickly. Other events may affect the use of the primary in-ear device—the user may simply remove the primary in-ear device, by design or by accident, from his or her ear, the primary in-ear device may detect a degradation in operation, or the like. In some embodiments, the in-ear device may both be in-ear and may both have adequate battery power, but the primary in-ear device may be receiving a weak wireless signal from the smartphone. Such a condition may arise when the user places the smartphone on one side of his or her body and the primary in-ear device is located on the other side of his or her body. As described herein, the secondary in-ear device may determine one or more signal quality metric(s) of a wireless signal received from the smartphone (before actually establishing a wireless connection between the secondary in-ear device and the smartphone) and may send the determined one or more signal quality metric(s) to the primary in-ear device. The primary in-ear device may determine its own one or more signal quality metric(s) of a wireless signal received from the smartphone (i.e., the wireless signal used to establish the wireless connection between the primary in-ear device and the smartphone). As described in greater detail below, if the primary in-ear device determines that its received wireless signal is weak (i.e., the one or more signal quality metric(s) are lower than corresponding thresholds) and if the secondary in-ear device's received wireless in-ear device is strong (i.e., its one or more signal quality metric(s) are higher than corresponding thresholds), the primary in-ear device may send a command to the secondary in-ear device to assume the role of primary in-ear device. The signal quality metric(s) may be a packet error rate (PER) of the signal, a received signal strength indication (RSSI) of the signal, a signal-to-noise ratio (SNR) of the signal, and/or other such metric(s).

In these situations, the smartphone and secondary in-ear device are still functional (and/or on the user's person, in the user's vicinity, etc.), but impending loss of functionality of the primary in-ear device may lead to cessation of any communication being sent or received from the in-ear devices. Because communications between the smartphone and the secondary in-ear device are sent via the primary in-ear devices, loss of or disabling of the primary in-ear device means that no further communications can be sent or received to or from the smartphone using the secondary in-ear device. Cessation of communications may be inconvenient to the user, such as if music being output by the in-ear device ceases, or may be more than inconvenient if, for example, the user was engaged in an important telephone call or relying on audio navigation directions.

The present disclosure offers a system and method for handing over communication between a primary in-ear device and a smartphone (or other device) to communication between a secondary in-ear device and the smartphone when the primary and/or secondary in-ear device detects occurrence of an event prompting the handover. Such an event is herein also referred to as a handover trigger. The primary in-ear device switches from its role as primary to a role of secondary; similarly, the secondary in-ear device switches from its role as secondary to a role of primary. As explained further below, a first wireless connection connects the primary and secondary in-ear devices. The secondary in-ear device maintains information about a second wireless connection between the primary in-ear device and the smartphone, such as stack layer information, and/or baseband-connection information. The secondary in-ear device may further maintain information about the primary in-ear device, such as its address, digital-signal processing (DSP) information, sensor-related information, state, status, and/or information related to any application executing thereon. This wireless connection information may be sent from the primary in-ear device to the secondary in-ear device; instead or in addition, the secondary in-ear device may determine the connection information by monitoring the second wireless connection. As the term is used herein, as one of skill in the art will understand, monitoring a connection refers to analyzing a network connection, such as a wireless network connection, to determine one or more attributes regarding the network, such as stack information, baseband information, or any other such information. If the primary in-ear device determines that a handover trigger occurred, it may send a role-switch command to the secondary in-ear device and may disconnect the second wireless connection; the secondary in-ear device may connect the third wireless connection. As explained in greater detail below, before disconnecting the second wireless connection, the primary in-ear device may send any pending packets to the smartphone (i.e., "drain" packets) and/or may send a command to the smartphone to pause communications (i.e., a "flow off" command). The primary in-ear device may then send the role-switch command to the secondary in-ear device, which may, in response, send a confirmation of receipt to the primary in-ear device. Using the wireless connection information, the secondary in-ear device creates a third wireless connection with the smartphone.

FIG. 1A illustrates a system for wireless connection handoff including a first device 110a (e.g., a primary in-ear device) and a second device 110b (e.g., a secondary in-ear device). The first device 110a and the second device 110b communicate using a first wireless connection 114a, which may be a NFMI, Bluetooth, or similar connection. The first device 110a communicates with a third device 112, such as a smartphone, smart watch, or similar device, using a second wireless connection 114b established at least in part on a wireless signal 113 output by the third device 112, which may also be a Bluetooth or similar signal and connection. The present disclosure may refer to particular Bluetooth protocols, such as classic Bluetooth, Bluetooth Low Energy ("BLE" or "LE"), Bluetooth Basic Rate ("BR"), and/or Bluetooth Enhanced Data Rate ("EDR"), but the present disclosure is not limited to any particular Bluetooth or other protocol. In some embodiments, however, the first wireless connection 114a between the first device 110a and the second device 110b is a low-power connection such as BLE; the second wireless connection 114b may include a high-bandwidth connection such as EDR in addition to or instead of a BLE connection. The third device 112 communicates with one or more remote device(s) 120, which may be server devices, via a network 199, which may be the Internet, a wide- or local-area network, or any other network. The first device 110a may output first output audio 15a, and the second device 110b may output second output audio 15b. The first device 110a and second device 110b may capture input audio 11 from a user 5, process the input audio 11, and/or send the input audio 11 and/or processed input audio to the third device 112 and/or remote device(s) 120, as described in greater detail below. The first device 110a and/or second device 110b, whichever is acting in the primary role, may send, to the secondary device, any data remaining in its buffers after the handover of the wireless connection.

In various embodiments, as also explained in greater detail below, the first audio-output device 110a establishes (130) a first wireless connection between the first audio-output device 110a and a second audio-output device 110b; the first audio-output device corresponds to a primary role and the second in-ear device corresponds to a secondary role. As described herein, the first audio-output device may be a first wireless earbud, and the second audio-output device may be a second wireless earbud, but the present disclosure is not limited to only wireless earbuds. The first audio-output device 110a establishes (132) a second wireless connection between the first audio-output device 110a and a user device 112 (e.g., a smartphone). The first audio-output device 110a receives (134) first audio data from the user device 112 and determines (136) to disconnect the second wireless connection (i.e., to adopt the secondary role in response to, for example, determining a handoff trigger has occurred). The first audio-output device 110a determines (138) a delay time corresponding to the first audio data and sends (140) the delay time to the second audio-output device 110b. The first audio-output device 110a disconnects (142) the first wireless connection and sends, to the second audio-output device 110b, at least a portion of the first audio data. Referring also to FIG. 1B, the second audio-output device 110b receives (150) the time data and establishes (152) a third wireless connection with the third device. The second audio-output device 110b receives (154) and causes (156) output of the first audio data prior to the delay time elapsing.

FIGS. 2A and 2B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless in-ear devices having an inner-lobe insert; as mentioned above, however, the present disclosure is not limited to only wireless in-ear devices, and any wearable audio input/output system, such as a headset, over-the-ear headphones, or other such systems, is within the scope of the present disclosure.

The devices 110a/110b may include a loudspeaker 202a/202b, and one or more external microphone(s) (such as first microphones 204a/204b and second microphones 205a/205b), and/or one or more internal microphones (such as third microphones 206a/206b). The loudspeaker 202a/202b may be any type of loudspeaker, such as an electrodynamic loudspeaker, electrostatic loudspeaker, diaphragm loudspeaker, or piezoelectric loudspeaker; the microphones 204a/204b/205a/205b/206a/206b may be any type of microphones, such as piezoelectric or MEMS microphones. Each device 110a/110b may include one or more microphones 204a/204b/205a/205b/206a/206b.

The loudspeaker 202a/202b and microphones 204a/204b/205a/205b/206a/206b may be mounted on, disposed on, or otherwise connected to the device 110a/110b. The devices 110a/110b further include an inner-lobe insert 208a/208b that may bring the loudspeaker 202a/202b and/or third microphones 206a/206b closer to the eardrum of the user and/or block some ambient noise.

One or more additional components may be disposed in or on the devices 110a/110b. One or more batteries 207a/207b may be used to supply power to the devices 110a/110b. One or more antennas 210a/211a/210b/211b may be used to transmit and/or receive wireless signals over the first wireless connection 114a and/or second connection 114b. In some embodiments, a first pair of antennas 210a/210b are configured to send and receive wireless signals using a first wireless network, such as a Bluetooth network, and a second pair of antennas 211a/211b are configured to send and receive wireless signals using a second wireless network, such as a near-field magnetic induction (NFMI) network. A primary in-ear device, such as the first device 110a may use a first antenna 210a to communicate with the third device 112 using the second wireless connection 114b and may use a second antenna 211a to communicate with a secondary in-ear device, such as the second device 110b using the first wireless connection 114a. The secondary in-ear device, such as the second device 110b, may use a first antenna 210b to monitor the second connection 114b to determine network configuration information, such as the network address of the first device 110a, and/or to receive packets, and may use a second antenna 211b to communicate with the first device 110a using the first wireless connection 114a. The first and second devices 110a, 110b may reverse the uses of the antennas 210a/211a/210b/211b, as described above, when a handover is triggered and the devices trade roles as primary and secondary.

An I/O interface 212a/212b contains software and hardware to control the antennas 210a/210b and transmit signals to and/or from other components. A processor 214a/214b may be used to execute instructions in a memory 216a/216b; the memory 216a/216b may include volatile memory (e.g., random-access memory) and/or non-volatile memory or storage (e.g., flash memory). One or more sensors 218a/218b, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., the "in-ear" status of each device). FIG. 4 illustrates a right view 4a and a left view 4b of a user of the first device 110a and the second device 110b.

Figure 3A:
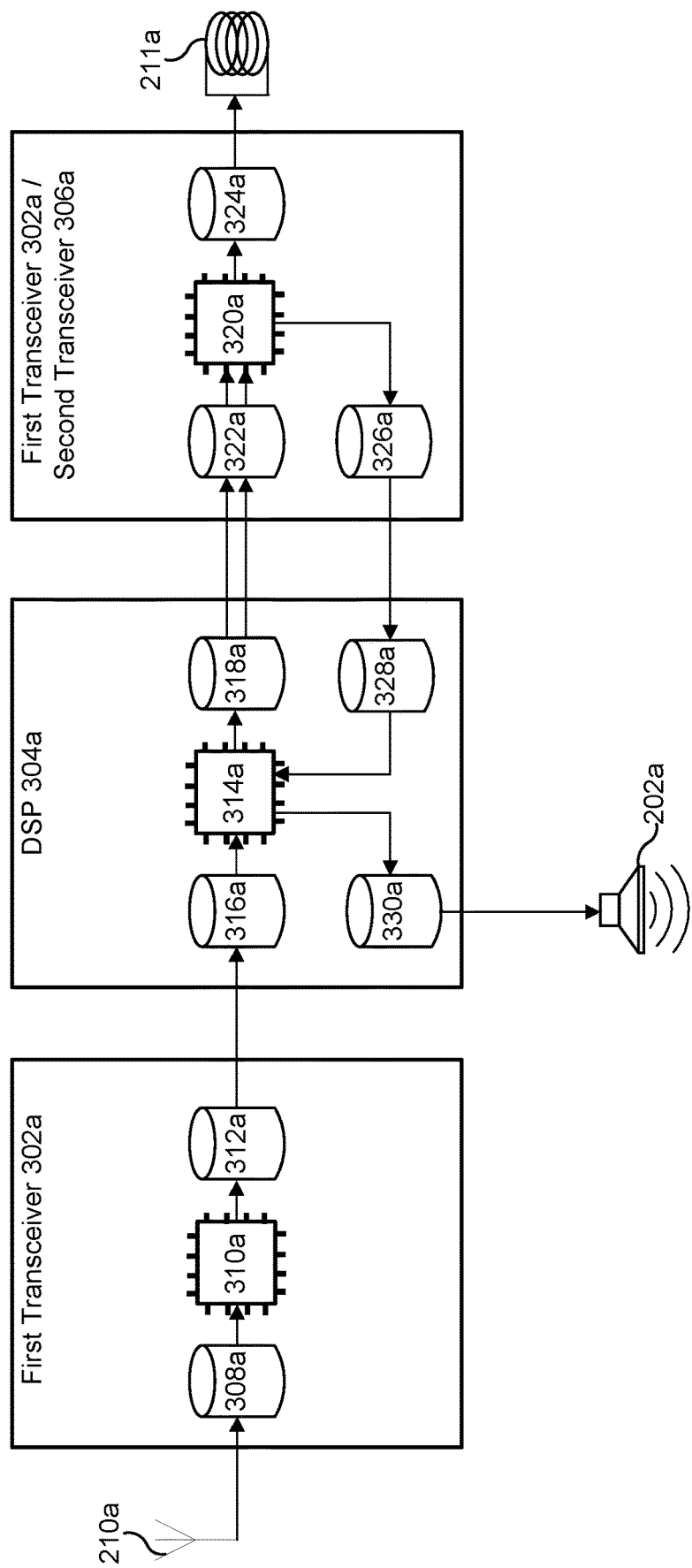
FIGS. 3A and 3B is a conceptual diagram of components of a wireless connection system according to embodiments of the present disclosure.
Figure 3B:
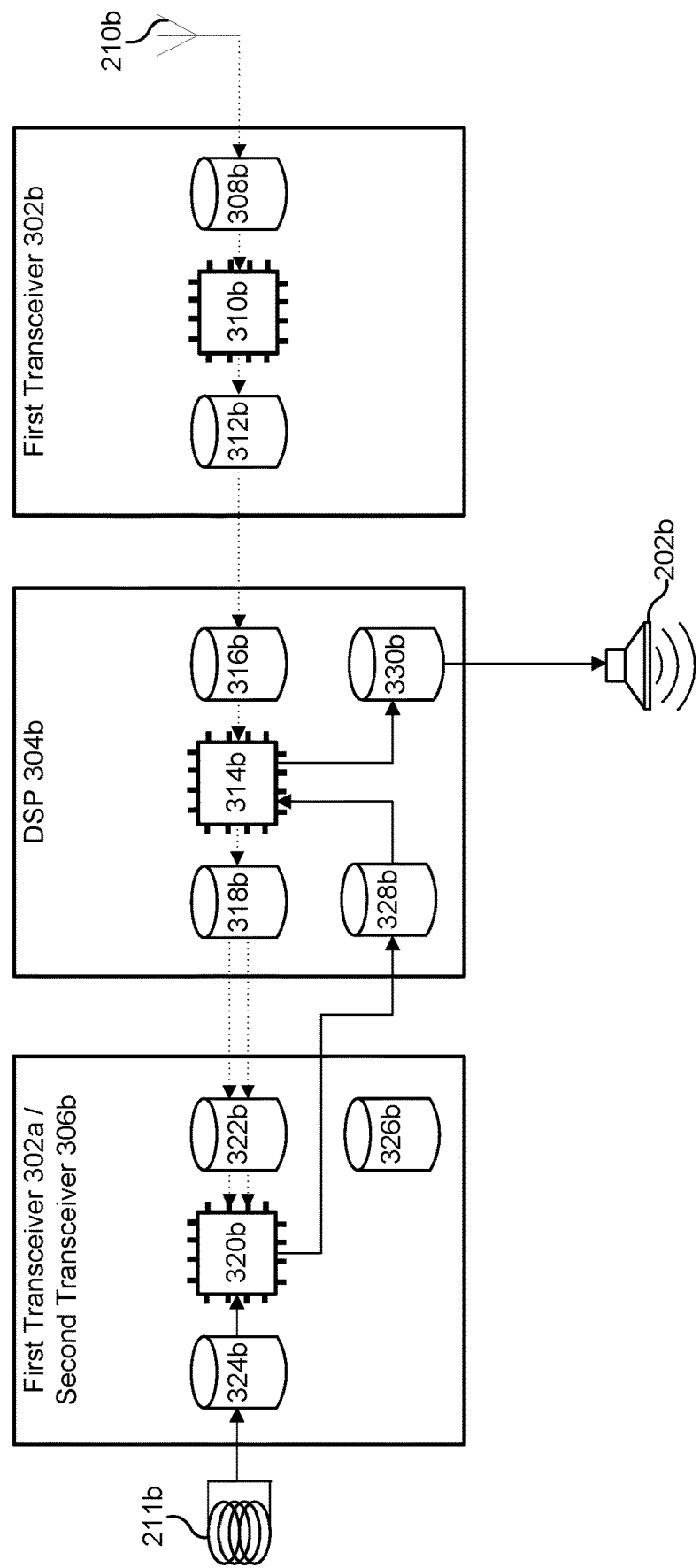

FIGS. 3A and 3B illustrate components of the first device 110a and second device 110b, respectively, in accordance with embodiments of the present disclosure. As explained herein, the first device 110a and the second device 110b may have similar or identical components, including hardware, software, and/or firmware components, but those components may be used differently depending on which device is configured to be the primary device and which device is configured to be the secondary device. Each of the first device 110a and second device 110b may thus include a first transceiver 302a/302b, a digital signal processor (DSP) 304a/304b, and/or a second transceiver 306a/306b; the DSP 304a/304b may include an audio encoder, decoder, and/or codec. In some embodiments, the first transceiver 302a/302b performs some or all of the functions of the second transceiver 306a/306b as described herein; in these embodiments, the second transceiver 306a/306b may not be included in the first device 110a and/or second device 110b. Each of these components and their operation in accordance with embodiments of the present disclosure are described in greater detail below.

Referring first to FIG. 3A, which corresponds to the first device 110a initially acting in a primary role, a first transceiver 302a receives data from a data source, such as the third device 112, using antenna 210a. The data may be audio data and may be packetized such that the data is segmented into discrete segments called packets. The packets may have a fixed or variable size, such as 128 bits or 1024 bits; each packet may include packet header information, such as a network address, packet size information, and/or packet type information; the audio data segment in the packet may be referred to as the payload of the packet.

The packets may be stored in a packet buffer 308a. The packets stored in the packet buffer 308a may be encoded using, for example, a Bluetooth encoding. The packets stored in the packet buffer 308a may be out-of-order meaning that a first packet representing audio data for a first time period may be received after a second packet representing audio data for a second time period after the first time period. The packet buffer 308a may store any number of packets, such as 5, 10, 20, or 100 packets. The packet buffer 308a may be a computer memory or part of a larger computer memory that stores other data and/or packets.

A first processor 310a may process the packets in the packet buffer 308a. The processing may include decoding the packets in the packet buffer 308a in accordance with, for example, a Bluetooth decoding protocol; in these embodiments, the first transceiver 302a may be part of a Bluetooth system-on-a-chip (SoC). The processing may further include sorting the packets in the packet buffer 308a in accordance with packet-numbering information in the packets and/or date and/or time information in the packets. The first processor 310a may store the decoded and/or sorted packets in a media buffer 312a. The media buffer 312a may store any number of packets, such as 5, 10, 20, or 100 packets. In some embodiments, the packet buffer 308a stores a number of packets that correspond to 20-30 milliseconds of audio; the media buffer 312a stores a number of packets that correspond to 150-200 milliseconds of audio The media buffer 312a, like the packet buffer 308a, may be a computer memory or part of a larger computer memory that stores other data and/or packets. In some embodiments, the packet buffer 308a and the media buffer 312a are part of the same computer memory. The packet buffer 308a and the media buffer 312a may be, for example, first-in-first-out queues, stacks, or other types of computer memory. The first processor 310a may be a computer processor, digital-signal processor, and/or an analog or digital computer circuit.

A digital-signal processor (DSP) 304a may be used to process the output of the first transceiver 302a. The DSP 304a may, for example, separate the audio data into left and right stereo channels. The DSP 304a may further include an audio encoder, decoder, and/or codec for encoding and/or decoding the audio data for output using a speaker 202a. The DSP 304a may include analog and/or digital logic 314a. The DSP 304a may include an input buffer 316a for storing incoming packets from the first transceiver 302a; this input buffer may be a computer memory. In some embodiments, the input buffer 316a is circuitry that adds latency to the input packets; this amount of latency may be approximately 6-10 milliseconds. Similarly, the DSP 304a may include an output buffer 318a that stores packets and/or adds latency to the output packets; this latency may similarly be approximately 6-10 milliseconds. As explained in greater detail below, the DSP 304a may determine that a handover trigger has occurred and may cause a role-switch command to be sent to the second device 110b to initiate a handover. The DSP 304a may further determine a delay time corresponding to a packet-sending time less a role-switch time, as also explained in greater detail below, and cause the delay time to be sent to the second device 110b.

A second transceiver 306a may receive output(s) of the DSP 304a and process the output for transmission using a second antenna 211a. In some embodiments, the second transceiver 306a is an NFMI transceiver and the second antenna 211a is an NFMI antenna. The second transceiver 306a may, like the first transceiver 302a, include a processing circuit 320a which may be a computer processor or digital and/or analog circuitry. The processing circuit 320a may process the data output by the DSP 304a to convert and/or encode the data in accordance with a wireless protocol, such as NFMI. An input buffer 322a may be used to store incoming data and/or may be circuitry that adds latency to the incoming data; this latency may be approximately 6-10 milliseconds. Similarly, an output buffer 324a may be used to store outgoing data and/or may be circuitry that adds latency to the outgoing data; this latency may be approximately 6-10 milliseconds. The output buffer 324a may receive one channel of a pair of stereo channels, such as a left or right channel; a delay buffer 326a may receive the other of the channels. The delay buffer 326a may be used to compensate for a delay in transmitting the other channel using the second antenna 211a such that audio output by the loudspeaker 202a is output at the same time as corresponding output of the second device 110b. The output of the delay buffer 326a may be sent back to the DSP 304a; at the DSP 304a, the output of the second transceiver 306a may be stored in an input buffer 328a, processed by the DSP 304a, and finally stored in an output buffer 330a before being sent to the loudspeaker 202a. In some embodiments, the first transceiver 302a includes some or all of the components 320a, 322a, 324a, 326a; in these embodiments, the first device 110a does not include the second transceiver 306a.

Referring to FIG. 3B and its depiction of the second device 110b, the second device 110b may include similar or identical components of the first device 110a (with reference also to FIG. 3A). The second device 110b may thus include a first transceiver 302b, a DSP 304b, a second transceiver 306b, a first antenna 210b, a second antenna 211b, and a loudspeaker 202b. Like the first device 110a, the second device 110b may not, in some embodiments, include the second transceiver 306a; in these embodiments, the first transceiver 302a performs the functions described herein associated with the second transceiver 306a and may include some or all of the components 320b, 322b, 324b, 326b described below with respect to the second transceiver 306b. The second transceiver 306b may receive, using the antenna 211b, from the first device 110a, audio data. The second transceiver 306b may use a processor 320b to process and store the audio data in an input buffer 324b and may process the audio data to decode it from, for example, an NFMI encoding. The second transceiver 306b may include a delay buffer 326b but may bypass the delay buffer 326b when sending output audio to the DSP 304b to account for the delay in receiving the audio data from the second antenna 211b. The DSP 304b may store the audio data in an input buffer 328b, process the audio data to, for example, decode the audio data, store the decoded audio data in an output buffer 330b, and finally send the decoded audio data to the loudspeaker 202b. The first transceiver 302b may not be used by the second device 110b when it is in a secondary role, as shown; the second transceiver 302b may, however, receive packets sent from the third device 112 using the first antenna 210b, store the packets in a packet buffer 308b, process the packets with a processor 310b, and store the processed packets in a media buffer 312b. The DSP 304b may similarly store the packets in an input buffer 316b and/or output buffer 318b.

FIGS. 4A-4F illustrate process flows in accordance with the present disclosure. With reference first to FIG. 4A, the third device 112 stores representative packets 5, 6, 7, 8 in a buffer, such as an output buffer. The third device 112 sends, using the second wireless connection 114b, packets to the first device 110a. The first device 110a, acting as primary, receives the packets and stores them in one or more buffers, such as the packet buffer 308a and/or the media buffer 312a. The first device 110a thus receives and stores representative packets 1, 2, and 3 in the media buffer 312a and packet 4 in the packet buffer 308a. Because the first device 110a is acting in a primary role, the first device 110a sends packets to the second device 110b, acting as secondary, using the first wireless connection 114a. The second device 110b receives the packets and stores them in one or more buffers, such as the packet buffer 308b and/or the media buffer 312b. The second device 110b thus receives and stores representative packet 1 in media buffer 312b and packet 2 in packet buffer 308b. The first device 110a and second device 110b output audio corresponding to the received packets.

The first device 110a and/or second device 110b may determine that a handover trigger has occurred. As disclosed herein with reference to FIGS. 5A-5F and associated text, a handover trigger may include that the first device 110a and/or second device 110b has an out-of-ear status, that the first device 110a and/or second device 110b has low signal quality, and/or that the first device 110a and/or second device 110b have low power. If the first device 110a determines that the handover trigger has occurred, it sends a role-switch command to the second device 110b. If the second device 110b determines that the handover trigger has occurred, it sends a request for a handover to the first device 110a, which may in response send the role-switch command to the second device 110b.

Prior to, during, or after sending the role-switch command, the first device 110a determines a delay time and sends the delay time to the second device 110b. The delay time may be a role-switch time 402 subtracted from a packet-sending time 404. The role-switch time 402 represents a time period between sending of the role-switch command and the completion of the role switch. The first device 110a may determine the role-switch time 402 by computing a time to transmit the role-switch command, a time to execute the role-switch command, and a time to receive a confirmation, from the second device 110b, of the role-switch. In some embodiments, the role-switch time 402 is fixed and may be, for example, 200 milliseconds. In other embodiments, the first device 110a determines the role-switch time by measuring the time of one or more previous role switches. In other embodiments, the role-switch time 402 varies based on an amount of input audio data in an input buffer on the first device 110a and/or second device 110b; this input audio data may represent data from a microphone, and the first device 110a and/or second device 110b may delay the role switch by the time it takes to empty the input buffer by sending the input audio data to the third device 112.

The first device 110a may further determine a packet-sending time 404. The packet-sending time 404 corresponds to a time required by the first device 110a to send packets in its buffers, such as packet buffer 308a and/or media buffer 312a, to the second device 110b. The first device 110a may determine the packet-sending time 404 by determining a number of packets present in the packet buffer 308a and/or media buffer 312a and multiplying this number by the time required to send a single packet. The first device 110a may instead or in addition determine a size in bytes of all the packets present in the packet buffer 308a and/or media buffer 312a and multiply this size by the time required to send a byte. The size of the packets may be uniform or may vary. The packet-sending time 404 may further include time for network overhead, such as waiting for an available Bluetooth slot. This network overhead may represent the time of two Bluetooth slots.

FIG. 4B illustrates the first device 110a, second device 110b, and third device 112 after the first device 110a sends the role-switch command to the second device 110b but before the first device 110a and the second device 110b have exchanged roles as primary and secondary. Because the devices 110a/110b have not yet switched roles, the third device 112 may send one or more packets, such as packet 6, to the first device 110a, and/or the first device 110a may send one or more packets, such as packet 3, to the second device 110b. The first device 110a and/or second device 110a may further, during this time period, output audio corresponding to one or more stored packets, such as packet 1, and may thereafter remove those stored packets from the buffers.

During the time period depicted in FIG. 4B, during which the first device 110a has sent the role-switch command and the delay time to the second device 110b, but before the role switch occurs, the first device 110a may determine that the delay time has changed. The first device 110a may thus recompute the delay time and send the recomputed delay time to the second device 110b. The second device 110b may then discard and/or ignore the originally sent delay time and use the recomputed delay time to determine when to cease using audio packets received from the first device 110a for audio output and begin using audio packets received from the third device 112 for audio output. The first device 110a may recompute and send the delay time when, as depicted in FIG. 4B, the third device 112 sends one or more packets to the first device 110a after the first device 110a sends the role-switch command and delay time but before the role switch. If the first device 110a determines that the third device 112 sends the one or more packets, the first device 110a may recompute the delay time to include additional time, if any, for sending the additional one or more packets to the second device 110b.

In some embodiments, the first device 110a may recompute and send the delay time when the first device 110a is delayed in sending the role-switch command and/or delay time. The first device 110a may be delayed in sending the role-switch command and/or delay time when the first wireless connection 114a is unavailable for transmitting data. The first wireless connection 114a may be unavailable for transmitting data, such as the role-switch command and/or delay time, when the first device 110a and/or second device 110b are using the first wireless connection 114a to transmit other data, such as audio data or other command data. The first wireless connection 114a may be unavailable for transmitting data also when the first wireless connection 114a is disconnected, such as when the first device 110a and/or second device 110b are powered off, separated in distance, or disposed opposite a barrier preventing wireless communication. The first device 110a may determine a time between determining to initiate the role switch and a present time, by, for example, starting a timer when first determining to initiate the role switch and by comparing the time represented by the timer to a threshold time. The threshold time may be, for example, 1-10 milliseconds. If the time represented by the timer meets or exceeds the threshold time, the first device 110a may, as described above, recompute and re-send the delay time.

FIG. 4C illustrates completion of the handover. The first device 110a disconnects the second wireless connection 114b, and the second device 110b establishes the third wireless connection 114c. The second device 110b assumes the role of primary and the first device 110a assumes the role of secondary. As explained in greater detail below, however, the first device 110a continues to send packets to the second device 110b using the first wireless connection 114a.

FIG. 4D illustrates an embodiment in which the handover has occurred but in which the first device 110a is still sending packets to the second device 110b. During this time, the third device 112 may send one or more packets, such as packet 6, to the second device 110a, which may store the packet(s) in a buffer, such as the packet buffer 308b.

FIG. 4E illustrates another embodiment in which the handover has occurred but in which the first device 110a is still sending packets to the second device 110b. During this time, the third device 112 may send one or more packets, such as packet 7, to the second device 110a, which may store the packet(s) in a buffer, such as the packet buffer 308b. Also during this time, the first device 110a may send one or more packets, such as packets 4, 5, to the second device 110b. The second device 110b outputs audio corresponding to the packets received from the first device 110a; the second device 110b stores any packets received from the third device 112 in a buffer, such as the packet buffer 308b and/or media buffer 312b, for later output.

FIG. 4F illustrates that when the second device 110b determines that the delay time, as received from the first device 110a, has elapsed, the first device 110a and the second device 110b reverse the flow of packets over the first wireless connection 114a, and the second device 110b sends packets, such as packet 6, to the first device 110a. Also, when the second device 110b determines that the delay time, as received from the first device 110a, has elapsed, the second device 110b begins outputting audio corresponding to packets received from the third device 112, such as packet 8.

In some embodiments, as described herein, the second device 110b, while it has adopted the secondary role and before it adopts the primary role, monitors the second wireless connection 114c and may receive some or all of data sent from the third device 112, for example, packets transmitted by the third device 112. When the second device 110b receives the role-switch command and/or the delay time, the second device 110b may send, to the first device 110a, data representing the packets it received from the third device 112. The first device 110a may then omit the packets already received by the second device 110b from data sent, using the first wireless connection 114a, to the second device 110b. The first device 110a may further compute, or recompute, the delay time based at least in part on the data representing the packets the second device 110b received from the third device 112 by, for example, subtracting a number of packets received by the second device 110b from the number of packets stored on the first device 110a before multiplying the result by a time required for sending a single packet.

Figure 5B:
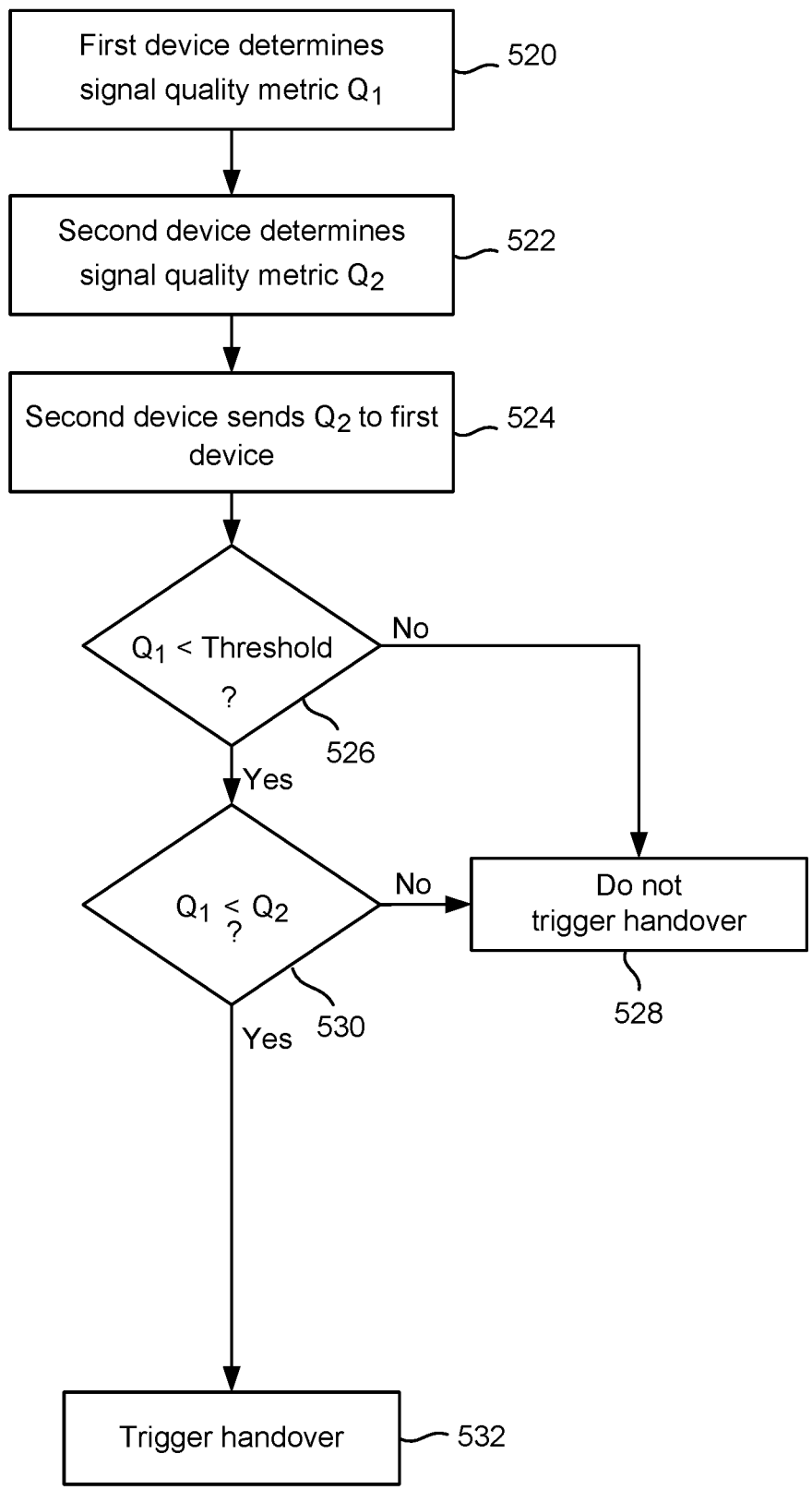
Figure 5C:
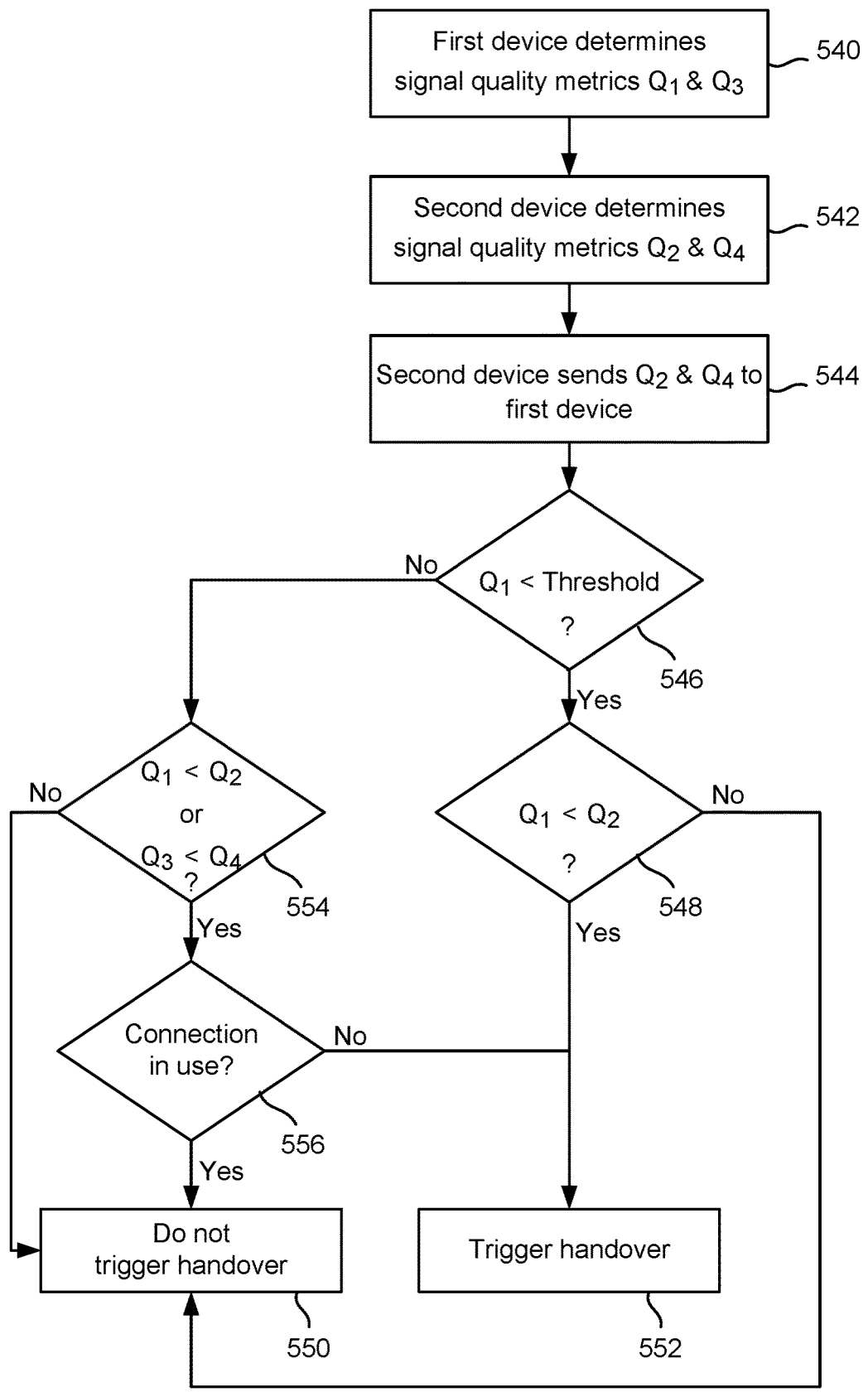
Figure 5D:
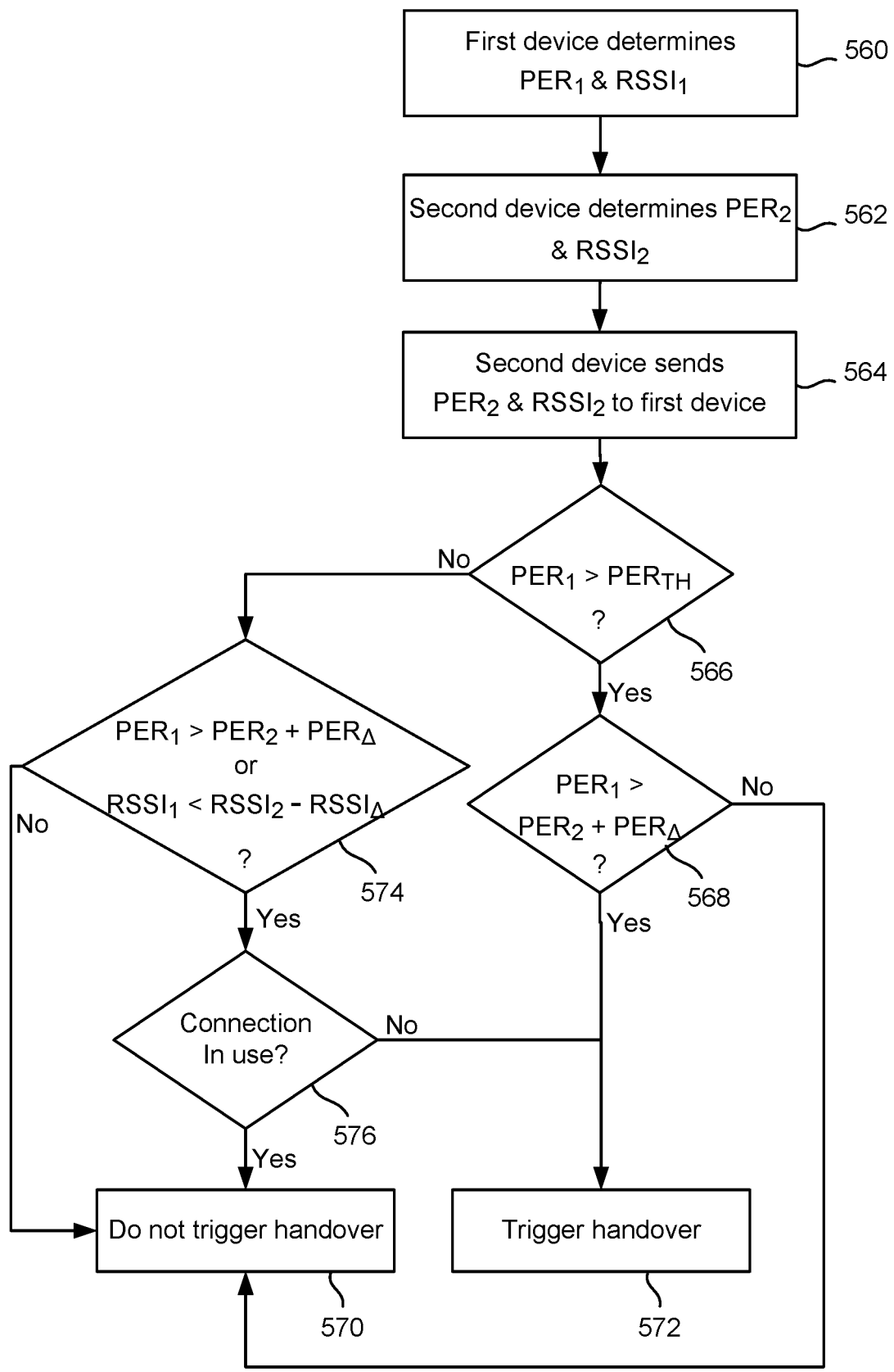
Figure 5E:
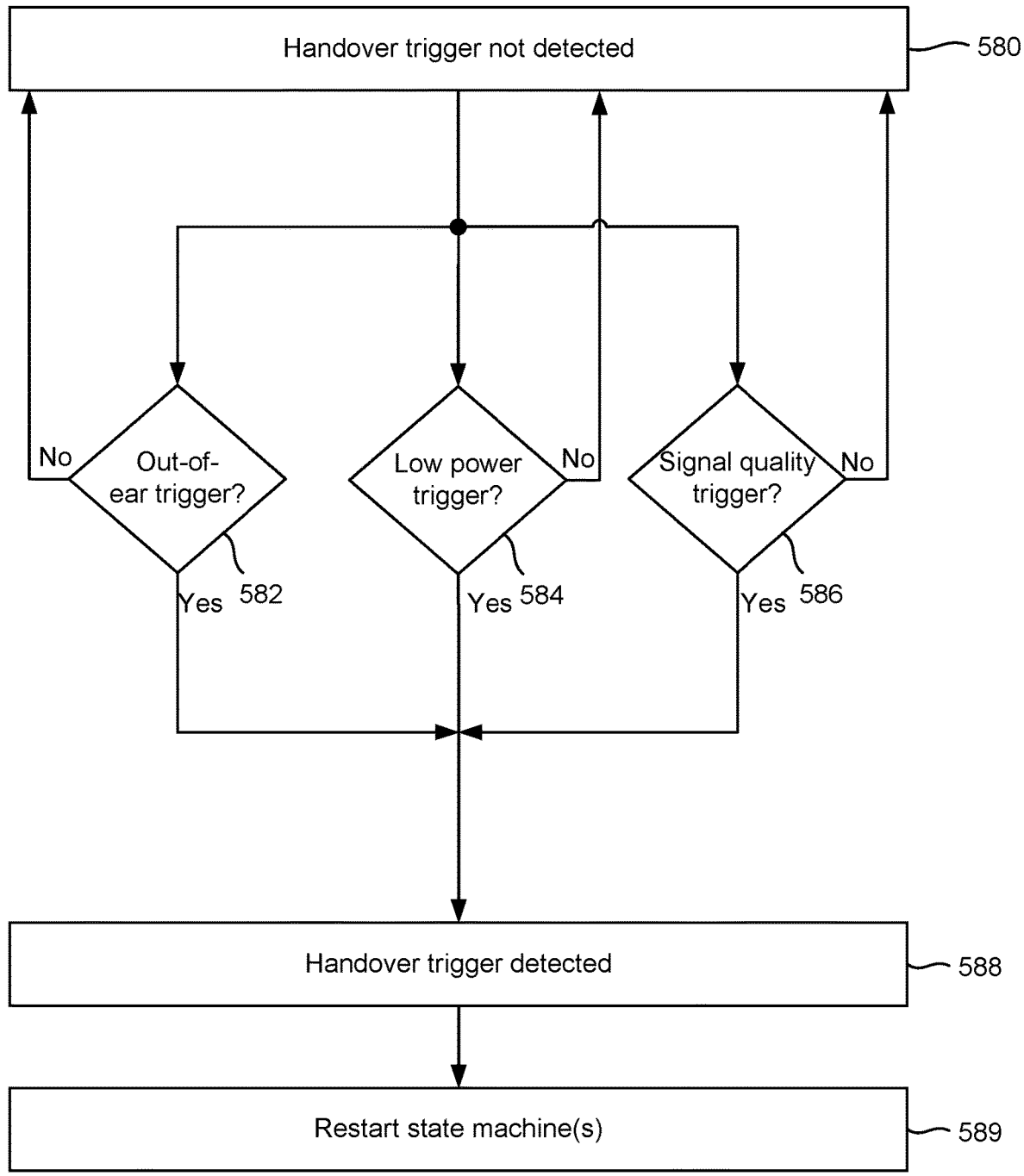
Figure 5F:
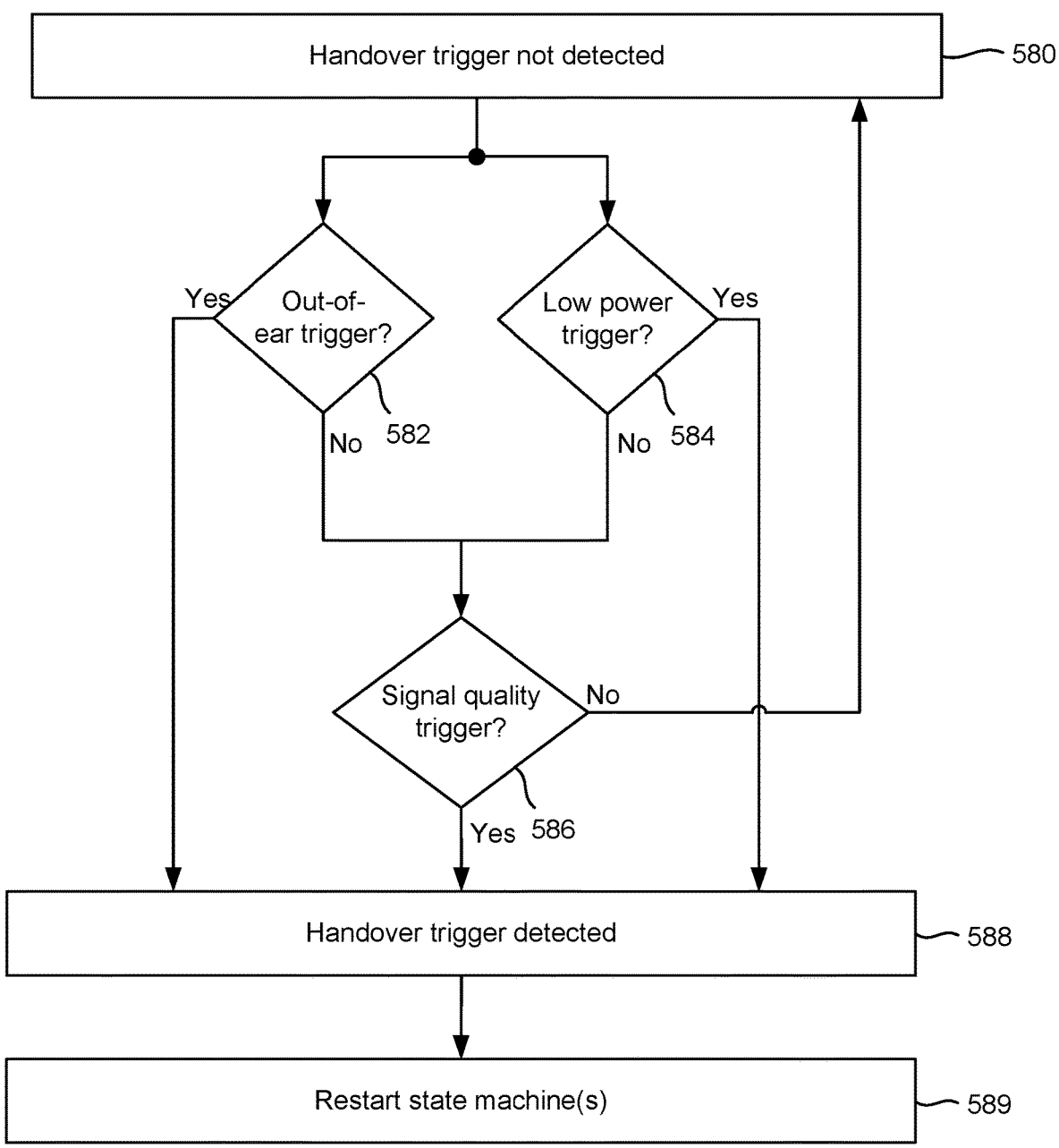

FIGS. 5A-5F and 6 illustrate process flows in accordance with the present disclosure. FIG. 5A is a process flow corresponding to an embodiment in which the second device 110b establishes a third wireless connection 114c with the third device 112. FIGS. 5B, 5C, and 5D are process flows corresponding to embodiments in which a handoff may be triggered by comparing signal quality metrics determined by the first device 110a and the second device 110b. FIGS. 5E and 5F are process flows corresponding to embodiments in which other handoff triggers, such as those based on out-of-ear status and battery power level, are considered. FIG. 6 is a process flow illustrating data movement between the first device 110a, second device 110b, and third device 112. Each of these process flows is discussed below in greater detail.

Referring again to FIG. 5A, the first device 110a and second device establish (502) the first wireless connection 114a. The first wireless connection 114 may be, as mentioned above, a Bluetooth connection such as a BLE connection, and may be established when the first device 110a and/or second device 110b power on and/or in response to a command from the third device 112. The first device 110a may, for example, broadcast an advertisement to the second device 110b, and the second device 110b may respond thereto. As mentioned above, the first device 110a and the second device 110b may include similar hardware and software but may each include configuration information that assigns roles of primary and secondary thereto upon power-on or reset. Any type of connection-establishing messages, handshaking, or other such process for establishing the first wireless connection 114a is within the scope of the present disclosure.

The second device 110b determines (504) first data corresponding to the second wireless connection 114b between the first device 110a and the third device 112. As mentioned above, the first device 110a may simply send this first data to the second device 110b and/or the second device 110b may determine the first data by monitoring the second wireless connection 114b. The first data may include, for example, network-stack information, baseband-connection information, or any other such information. Specifically, the first data may include the address of the first device 110*a* and/or third device 112, which may be a Bluetooth device address (BDA), and one or more security credentials associated with the third device 112, which may include a link key, a BLE long-term key, a BLE identity-resolution key, or any other such credential. The first data may further include a service discovery protocol (SDP) record and/or logical-link control and adaptation protocol (L2CAP) channel information, such as channel identification (CID) information, protocol and service multiplexer (PSM) information, maximum transmission unit (MTU) information, or any other such channel information. The first data may further include radio-frequency communication (RFCOMM) link information, such as service channel number (SCN), credits, flow method, or other such link information. The first data may include profile information, such as hands-free status, advanced audio distribution profile (A2DP) information, audio/video remote-control profile (AVRCP) information, serial-port profile (SPP) information, or other such profile information. The first data may also include application-specific information, such as the application context of the first device 110*a* and/or second device 110*b*, sensor-related information such as orientation information, and/or configuration information for, for example digital-signal processing (DSP).

The first device 110*a* and/or second device 110*b* monitor the second wireless connection 114*b* to detect (506) any change therein and specifically any change that might affect the first data. Alternatively or in addition, the third device 112 may send data to the first device 110*a* indicating a change in the second wireless connection 114*b*. For example, the third device 112 may send data indicating a reconfiguring of the A2DP information. The first device 110*a* may thereafter send, to the second device 110*b*, data corresponding to the change or changes to the second wireless connection. The first device 110*a* may send both changed and unchanged data corresponding to the second wireless connection 114 or only changed data. Alternatively or in addition, as described above, the second device 110*b* may monitor the second wireless connection 114*b* and determine any changes therein directly. However the change to the second wireless connection 114*b* is determined, the second device 110*b* may update (508) the first data based thereon to create updated first data. When the second device 110*a* later creates the third wireless connection 114*c*, the updated first data may be used. The second device 110*b* may not update the first data or may update it any number of times.

The first device 110*a* and/or second device 110*b* may detect (510) occurrence of an event corresponding to a change in status of the first device 110*a*, which event may be referred herein as a handoff-triggering event or a handoff trigger. In various embodiments, the event may be a first battery level of the first device 110*a* falling below a first threshold (e.g., 5% or 10%) and/or a difference between the first battery level and a second battery level of the second device rising above a second threshold (e.g., second battery level>first battery level by 20%). The event may be a rate of decrease of the first battery level being greater than a threshold. The event may be a velocity or acceleration of the first device 110*a* being greater than a threshold and a velocity or acceleration of the second device 110*b* being below the threshold. The event may be an in-ear status of the first device being false and an in-ear status of the second device being true. The in-ear status may be "true" if the device is in the user's ear and "false" if the device is not in the user's ear and may be determined at least in part on data from sensors 318*a/b*. The event may further be a determination that a signal quality metric corresponding to the wireless signal 113 is greater for the second device 110*b* than for the first device 110*a*, as described in greater detail below.

If no event is detected, the first device 110*a* and/or second device 110*b* may continue to continually or periodically continue to monitor detection of the event. If, however, the event is detected, the first device 110*a* may send (512), to the second device 110*b*, a role-switch command corresponding to occurrence of the event. The role-switch command may include a binary number, such as a 16- or 32-bit binary number, that uniquely identifies the command as the role-switch command. The role-switch command may be part of a group of other commands, which may similarly include other unique binary numbers that identify other commands, such as a send command, receive command, or restart command. The second device 110*b* may receive the role-switch command and compare its corresponding binary number it to a stored list of binary numbers corresponding to known commands. The second device 110*b* may determine that the command is the role-switch command by matching the received binary number to one of the list of binary numbers corresponding to the role-switch command. In some embodiments, the role-switch command includes the delay time, as described above with reference to FIGS. 4A-4F; the delay time may similarly be represented as a binary number that represents the delay time. In other embodiments, the role-switch command does not include the delay time; in these embodiments, the first device 110*a* sends the binary number representing the delay time separate from sending the role-switch command.

The role-switch command may thus inform the second device 110*b* to initiate the handover. In response, the second device 110*b* may send, to the first device 110*a*, an acknowledgement of receipt of the role-switch command. If the first device 110*a* does not receive (514) the acknowledgement after a certain amount of time (e.g., 100 milliseconds) after sending the role-switch command, the first device 110*a* may re-send the role-switch command and wait again for the acknowledgement. If the first device 110*a* does not receive the acknowledgement after a number of times of sending the role-switch command (e.g., 1-5 times), the first device 110*a* may halt the process flow and take no further action regarding establishing the third wireless connection 114*c*.

Once the acknowledgement is received, the first device 110*a* disconnects (516) the second wireless connection 114*b*. This disconnecting may include sending, from the first device 110*a* to the third device 112, packets queued to be sent or otherwise addressed to the third device 112. This sending of packets may be referred to as a draining of packets; the packets may be asynchronous connectionless (ACL) packets. The first device 110*a* may further send the third device 112 a command to disconnect the second wireless connection 114*b* and/or a command to pause transmission of further packets. This pause command to cease transmission may be a "flow off" command.

In response to sending the role-switch command and acknowledgement thereof, the first device 110*a* may change its configuration to correspond to a secondary device, and the second device 110*b* may change its configuration to correspond to a primary device. The first device 110*a* may thus thereafter perform steps 140-148 of FIG. 1B, formerly associated with the second device 110*b*, and the second device 110*b* may thereafter perform steps 103-140 of FIG. 1A, formerly associated with the first device 110*a*. Instead of or in addition to sending the acknowledgement of receipt of the role-switch command, the first device 110a and the second device 110b may exchange handshake information associated with the switching of their roles.

The second device 110b establishes (518) the third wireless connection 114c with the third device 112. Establishing the third wireless connection 114c may include sending, from the second device 110b to the third device 112, a resume command to resume sending of packets; this command may be a "flow on" command. Establishing the third wireless connection 114c may further include sending, from the second device 110b to the third device 112, data corresponding to a request to establish the third wireless connection 114c; this request may be a Bluetooth advertisement request. The third wireless connection 114c, like the second wireless connection 114b, may include a BLE and/or EDR connection. The time elapsed between determining occurrence of the event and the establishment of the third wireless connection 114c may be approximately 150-250 milliseconds.

FIG. 5B is a process flow corresponding to an embodiment in which a handoff may be triggered by comparing, by the first device 110a, signal quality metrics determined by the first device 110a and the second device 110b. The first device 110a determines (520) a first signal quality metric $Q_1$ corresponding to a signal quality of a received wireless signal 113 from the third device 112, and the second device 110b determines (522) a second signal quality metric $Q_2$ corresponding to a signal quality of a received wireless signal 113 from the third device 112. As mentioned above, the signal quality metric may be a packet error rate (PER), a received signal strength indication (RSSI), or a signal-to-noise ratio (SNR). The PER may be computed by determining a number of dropped, damaged, or otherwise missing or defective packets (received from the third device 112 via the second wireless connection 114) in a number of received packets, such as 100 packets. The RSSI may be a number from 0-100 indicating a power level of the received wireless signal 113, where 0 indicates no power (i.e., the device 110a/110b received 0% of the power transmitted by the third device 112) and 100 indicates maximum power (i.e., the device 110a/110b received 100% of the power transmitted by the third device 112). As mentioned above, the second device 110b determines the second signal quality metric $Q_2$ without establishing the third wireless connection 114c by monitoring the wireless signal 113—this process may be referred to as "sniffing" or "snooping."

The first device 110a and/or second device 110b may include state machines that compute a running average of the PER for a number of last-received packets, such as 100 or 1000 packets. The state machines of the first and/or second device 110a/110b may compute similar running averages for the RSSI and/or SNR for an amount of time corresponding to the amount of time it takes to receive the number packets (e.g., 100 milliseconds for 100 packets or 1 second for 1000 packets). In some embodiments, the running averages are weighted to emphasize more recently received packets or signal data and to de-emphasize less recently received packets or signal data. For example, the signal quality metric may be weighted such that a shorter, more-recent time period comprises 20% of the average while a longer, less-recent time period comprises 80% of the average. In some embodiments, the more-recent time period corresponds to a time of receipt of a last 100 packets, and the less-recent time period corresponds to a time of receipt of 900 packets received prior to the 100 packets.

The second device 110b may determine and send (524) the second signal quality metric(s) $Q_2$ to the first device 110a at periodic intervals, such as once every 100 milliseconds. The second device 110b may instead or in addition determine and send the second signal quality metric(s) $Q_2$ to the first device 110a in response to a received request from the first device 110a. The second device 110b may further determine a signal quality metric(s) $Q_{2,1}$ and later determine another signal quality metric(s) $Q_{2,2}$; the second device may send the signal quality metric(s) $Q_{2,2}$ to the first device 110a only if it differs from the first signal quality metric(s) $Q_{2,1}$ by a threshold amount, such as 5%. The second device 110b may send the signal quality metric(s) $Q_{2,2}$ upon determining that it differs by more than the threshold amount or at the next periodic interval.

The first device 110a compares (526) the first signal quality metric(s) $Q_1$ to a quality threshold upon receipt of the second signal quality metric $Q_2$ and/or periodically (e.g., every 100 milliseconds). The quality threshold may differ for different signal quality metrics. For example, if the first signal quality metric $Q_1$ is PER, the PER quality threshold may be 10% (i.e., 10% packet loss). If the first signal quality metric $Q_1$ is RSSI, the RSSI quality threshold may be 50 (i.e., the first device 110a receives 50% of power transmitted by the third device). The quality threshold may be fixed or may change dynamically. The first and/or second device 110a/110b may raise the quality threshold when, for example, PER is high or RSSI is low and may lower the quality threshold when, for example, PER is low or RSSI is high.

If the first signal quality metric(s) $Q_1$ ER satisfies the quality threshold (i.e., the PER is less than the PER threshold or the RSSI is greater than the PER threshold), the first device 110a does not trigger (528) the handover and halts the process. If however, the first signal quality metric(s) $Q_1$ does not satisfy the quality threshold (i.e., the PER is greater than the PER threshold or the RSSI is less than the PER threshold), the first device 110a compares (530) the first signal quality metric(s) $Q_1$ and the second signal quality metric(s) $Q_2$. If the second signal quality metric(s) $Q_2$ indicates a better signal quality than the first signal quality metric(s) $Q_1$, the first device 110a determines (532) that a handover trigger is detected and sends (512)—with reference also to FIG. 5A—a role-switch command to the second device 110a.

In some embodiments, the first device 110a applies a hysteresis factor (i.e., a delta factor) when comparing the first signal quality metric(s) $Q_1$ to the quality threshold and/or when comparing the first signal quality metric(s) $Q_1$ to the second signal quality metric(s) $Q_2$. In various embodiments, the delta factor may correspond to a difference of 2% or 3% between the first signal quality metric(s) $Q_1$ and quality threshold and/or the first signal quality metric(s) $Q_1$ and second signal quality metric(s) $Q_2$. The delta factor may thus represent a minimum improvement in signal quality required for the handover—if there would be only a slight improvement in signal quality (e.g., 1%) by triggering a handover, the handover is not triggered. In these embodiments, the first device 110a determines that the first signal quality metric(s) $Q_1$ does not satisfy the quality threshold only if it is greater than (for PER) or less than (for RSSI) the corresponding quality threshold by more than the delta factor. Similarly, the first device 110a may determine that second signal quality metric(s) $Q_2$ indicates a better signal quality than the first signal quality metric(s) $Q_1$ only if the second signal quality metric(s) $Q_2$ is less than (for PER) or greater than (for RSSI) the first signal quality metric(s) $Q_1$ by more than the delta factor. Thus, even if the first signal quality metric(s) $Q_1$ indicates poor signal quality, the first device 110a triggers the handover to the second device 110b only if the second signal quality metric(s) $Q_2$ is not just better than the first signal quality metric(s) $Q_1$, but better than the first signal quality metric(s) $Q_1$ plus the delta factor.

FIG. 5C is a process flow corresponding to an embodiment in which a handoff may be triggered by comparing, by the first device 110a, two signal quality metrics determined by the first device 110a and the second device 110b. The first device 110a determines (540) a first signal quality metric $Q_1$ corresponding to a signal quality of a received wireless signal 113 from the third device 112, and the second device 110b determines (542) a second signal quality metric $Q_2$ corresponding to a signal quality of a received wireless signal 113 from the third device 112. The first device 110a further determines a third signal quality metric $Q_3$ corresponding to another signal quality of the received wireless signal, and the second device 110b further determines a fourth signal quality metric $Q_4$ corresponding to another signal quality of the received wireless signal. The second device 110b sends (544) the second and fourth signal quality metrics $Q_3$ and $Q_4$ to the first device 110a.

The first device 110a, as described above with reference to FIG. 5B, compares (546) the first signal quality metric $Q_1$ to a quality threshold and, if the quality threshold is not satisfied, compares (548) the first signal quality metric $Q_1$ to the second signal quality metric $Q_2$. If the second signal quality metric(s) $Q_2$ does not indicate a better signal quality than the first signal quality metric(s) $Q_1$, (in some embodiments, using the delta factor described above) the first device 110a determines (550) that not handover trigger is detected and halts the process. If, however, the second signal quality metric(s) $Q_2$ does indicate a better signal quality than the first signal quality metric(s) $Q_1$, (in some embodiments, using the delta factor described above), the first device 110a determines (552) a handover trigger is detected and sends (512)—with reference also to FIG. 5A—an indication of the handover to the second device 110a.

In some embodiments, the first device 110a may detect a trigger even if the first signal quality metric $Q_1$ meets the quality threshold if a signal quality associated with the second device 110b is better than that of a signal quality associated with the first device 110a. In other words, even if the second wireless connection 114b between the first device 110a and the third device 112 has an acceptable signal quality (i.e., the first signal quality metric satisfies the quality threshold), the first device 110a will trigger a handover to the second device 110b if the second device 110a is receiving the wireless signal 113 with an even higher quality.

Thus, after the first device 110a determines that the first signal quality metric $Q_1$ satisfies the quality threshold, the first device 110a compares (554) the first signal quality metric $Q_1$ with the second signal quality metric $Q_2$ and/or compares the third signal quality metric $Q_3$ with the fourth signal quality metric $Q_4$. In some embodiments, if either comparison indicates that the wireless signal 113 as received by the second device 110b has a better quality than the second wireless connection 114b, the first device 110a determines (556) whether the second wireless connection 114b is in use. Determining whether the second wireless connection 114b is in use may include determining that audio is being output by the first device 110a and/or that audio is being input to the first device 110a. These determinations may be made by, for example, the first device 110a receiving status information from the third device; this status information may include an audio input and/or audio output status or a status corresponding to an audio input and/or output mode of operation of the device 110a, such as a phone-call mode, music-playing mode, or speech-detection mode. The first device 110a may further determine whether the second wireless connection 114b is in use by examining packets received from and/or sent to the third device 112 and determining that the received and/or sent packets correspond to audio-output packets and/or audio-input packets, or by detecting a wakeword.

If the first device 110 determines that the second wireless connection 114b is in use, the first device does not trigger (550) the handover. If the first device 110 determines that the second wireless connection 114b is not use, the first device trigger (552) the handover. Avoiding triggering the handover while the second wireless connection is in use may prevent errors or glitches in input or output audio.

FIG. 5D is similar to FIG. 5C but uses PER and RSSI as the signal quality metrics. The first device 110a determines (560) a $PER_1$ and a $RSSI_1$ for the second wireless connection 114b, and the second device determines (562) a $PER_2$ and a $RSSI_2$ corresponding to the received wireless signal 113; the second device 110b sends (564) the $PER_2$ and the $RSSI_2$ to the first device 110a. The first device 110a compares (566) the $PER_1$ to a PER quality threshold $PER_{TH}$; if it is greater, and if the first device 110a determines (568) that if the $PER_1$ is less than the $PER_2$ plus a PER delta factor $PER_A$, the first device 110a does not trigger (570) the handover. If, on the other hand, the first device 110a determines that the $PER_1$ is greater than the $PER_2$ plus the $PER_A$, the first device 110a does trigger (572) the handover.

If the first device 110a determines that the $PER_1$ is less than the $PER_{TH}$, the first device 110a further compares (574) the $PER_1$ to the $PER_2$ plus the $PER_A$ and the $RSSI_1$ to the $RSSI_2$ plus a $RSSI_A$. If the $PER_1$ is greater than the $PER_2$ plus the $PER_A$ and/or if the $RSSI_1$ is less than the $RSSI_2$ plus a $RSSI_A$, and if the first device 110a determines (576) that the second wireless connection 114b is not in use, the first device 110a triggers (572) the handover.

FIGS. 5E and 5F are process flows corresponding to embodiments in which other handoff triggers, such as those based on out-of-ear status and battery power level, are considered. In FIG. 5E, the first device 110a first does not detect (580) a handover trigger. The first device 110a may, however, detect a handover trigger (588) if any one of an out-of-ear trigger (582), a low-power trigger (584), and/or a low-signal-quality trigger (586) is determined. In FIG. 5E, the first device 110a may detect the out-of-ear trigger (582) and/or low-power trigger (584) first, and may detect the signal quality trigger (586) only thereafter. In some embodiments, even if the out-of-ear trigger (582) and/or low-power trigger (584) are detected, the system does not trigger the handover (588) if the signal quality of the secondary device is lower than that of the primary device and/or lower than a threshold. In other words, if the device 110a determines that it is out-of-ear and/or low on power, it won't trigger the handover to the second device 110b if the second device has a lower-quality wireless connection. After the handover trigger 588 is detected and, in some embodiments, after the handover process is complete, the first device 110a and/or second device 110b may reset 589 one or more state machines configured to compute the one or more signal quality metrics or corresponding running averages.

Figure 5G:
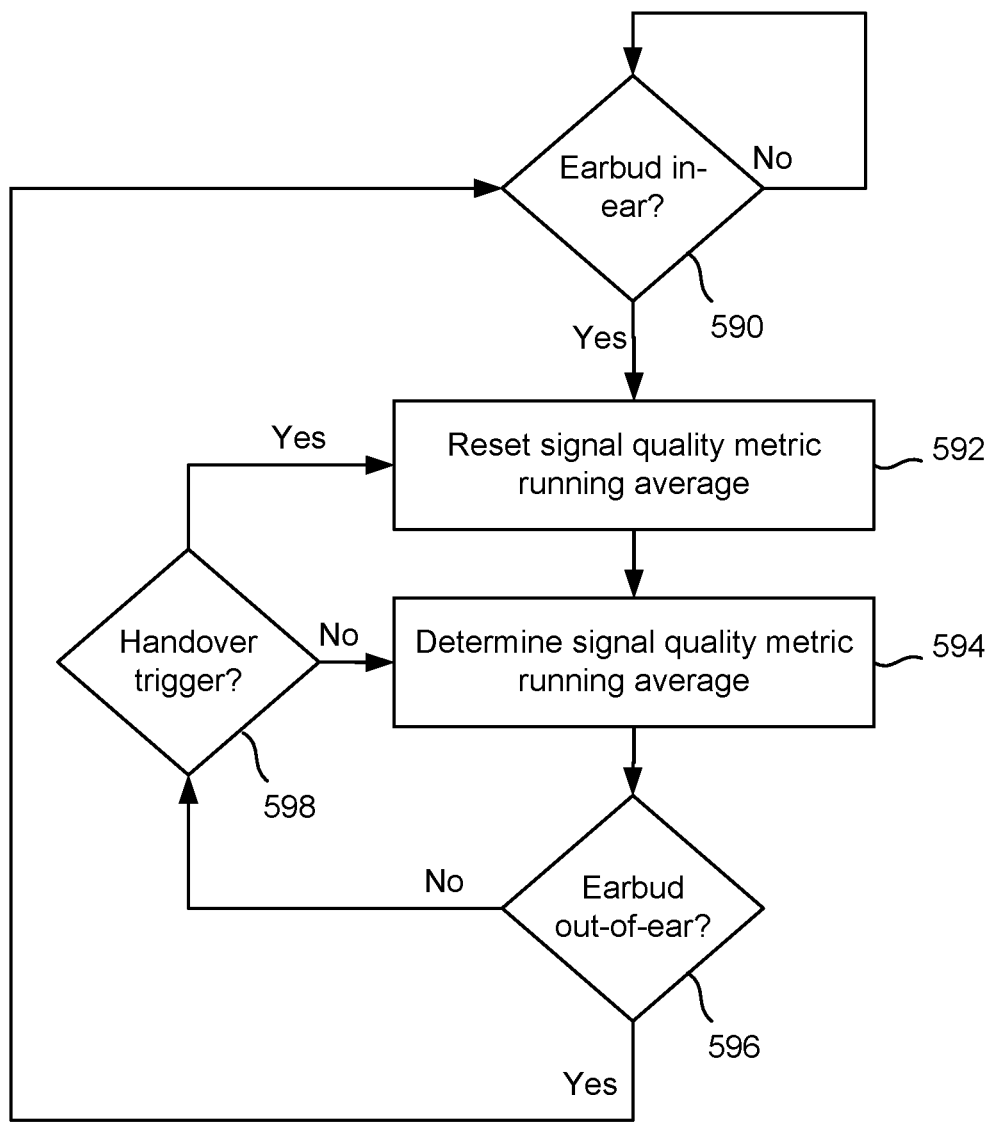

FIG. 5G illustrates a state machine for computing a running average of a signal quality metric in accordance with embodiments of the present disclosure. In a first step 590, the state machine determines whether the device 110a/110b is in-ear or out-of-ear using the various techniques described herein. If the device 110a/110b is not in-ear, the state machine continues to monitor its in-ear status but takes no further action. Once the device is in-ear, however, the state machine resets (592) a running average associated with a signal quality metric and thereafter determines (594) the running average. If the device 110*a*/110*b* is not out-of-ear (596), the state machine continues to compute the running average. If the device 110*a*/110*b* is out-of-ear, the state machine resumes monitoring for in-ear status. If a handover trigger is detected (598), the state machine similarly resets the running average.

FIG. 6 illustrates another embodiment of the present disclosure. As described above, the first wireless connection 114*a* connects the first device 110*a* and the second device 110*b*, and a second wireless connection 114*b* connects the first device 110*a* and the third device 112. The second device 110*b* determines first data 602 regarding the second wireless connection 114*b* by, as described above, receiving it from the first device 110*a* and/or by monitoring the second wireless connection 114*b*. The first device 110*a* may receive, from the third device 112, data 604 corresponding to a change in the second wireless connection 114*b* (for example, when a smartphone initiates or detects a change in the second wireless connection) and may forward some or all of this data 606 to the second device 110*b*. In some embodiments, the second device 110*b* instead or in addition determines a change in the second wireless connection 114*b* by monitoring the second wireless connection 114*b*. The first device 110*a* determines occurrence of an event corresponding to change in status of the first device 110*a*, i.e., a handover trigger 608. The first device 110*a* sends, to the third device 112, a command 610 to pause the second wireless connection 114*b* (i.e., a "flow off" command"). The first device 110*a* sends, to the third device 112, any packets 612 queued for or otherwise addressed to the third device 112 (i.e., the packets are drained from the first device 110*a* The first device 110*a* sends, to the third device 12, a command 614 to disconnect the second wireless connection 114*b*.

The first device may send the role-switch command 616 to the second device 110*b*, and the second device 110*b* may send a confirmation of receipt 618 in response. The role-switch command 616 may include, for example, a command informing the second device 110*b* to begin the handover process. Alternatively or in addition, the first device 110*a* and second device 110*b* may exchange handshake information (620); this handshake information may include a request or command to switch roles from primary to secondary and/or from secondary to primary. The handshake information may be sent from the first device 110*a* to the second device 110*b* and/or from the second device 110*b* to the first device 110*a*. The device receiving handshake information may respond to the sending device with an acknowledgement of receipt. As described above, the first device 110*a* and second device 110*b* may switch primary/secondary roles based on these commands. Once the switch is complete, the second device 110*b* sends a resume command to the third device 112 to resume (622) sending packets (i.e., a "flow on" command) and an advertisement (624). The third device 112 and/or second device 110*b* may thereafter establish the third wireless connection 114*c*.

Figure 8:
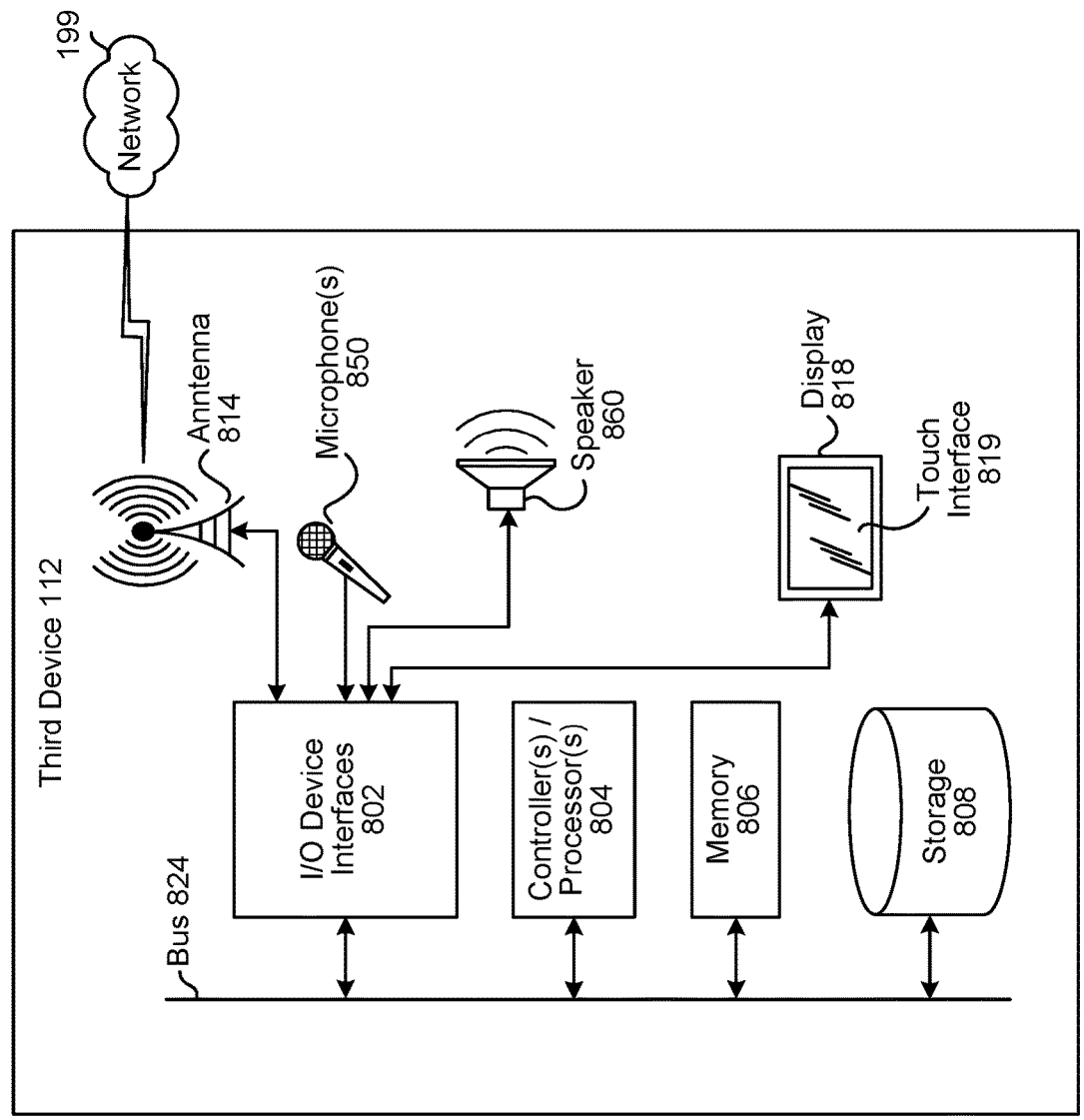
FIG. 8 is a block diagram conceptually illustrating an example user device according to embodiments of the present disclosure.
Figure 9:
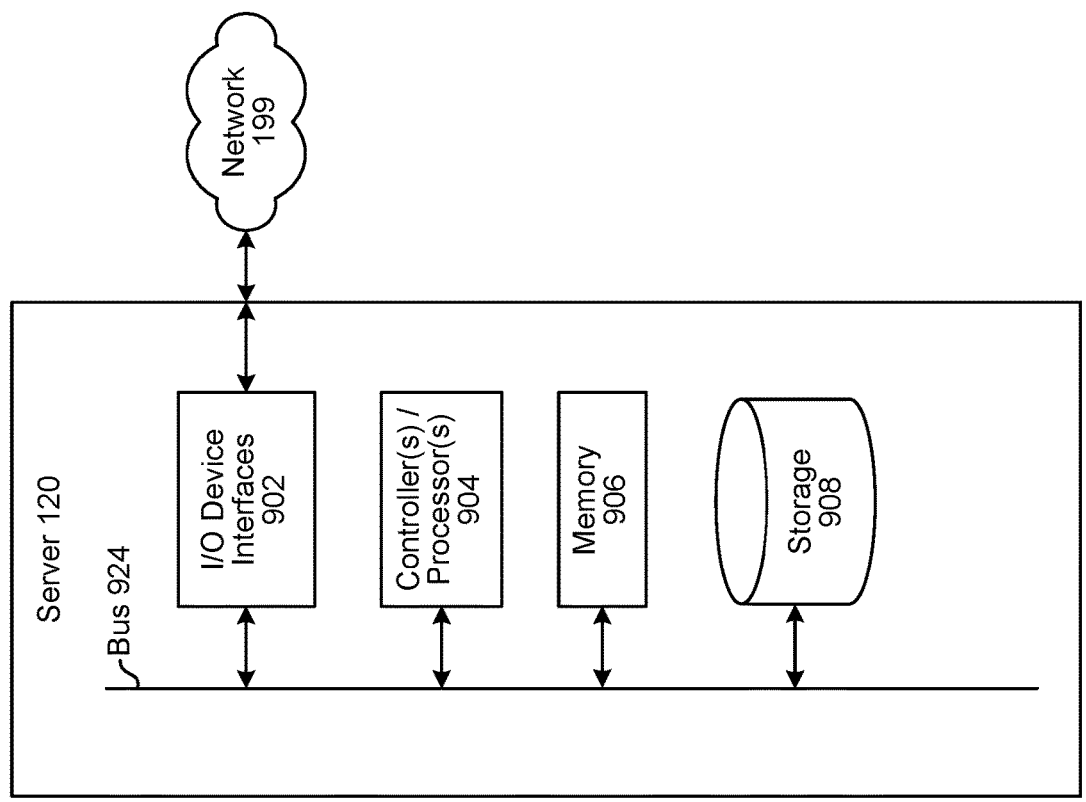
FIG. 9 is a block diagram conceptually illustrating an example remote device according to embodiments of the present disclosure.

FIG. 7 is a block diagram conceptually illustrating a first device 110*a* or second device 110*b* that may be used with the described system. FIG. 8 is a block diagram conceptually illustrating a third device 112 that may be used with the described system. FIG. 9 is a block diagram conceptually illustrating example components of a remote device, such as a remote server 120, that may assist with ASR, NLU processing, command processing, or the like. Multiple such devices 120 may be included in the system, such as one server(s) 120 for network provisioning, one server(s) for performing ASR, one server(s) 120 for performing NLU, etc. In operation, each of these devices (or groups of devices) may include computer-readable and computer-executable instructions that reside on the respective device (110*a*/110*b*/112/120), as will be discussed further below.

Each of these devices (110*a*/110*b*/112/120) may include one or more controllers/processors (214/804/904), which may each include a central processing unit (CPU) for processing data and computer-readable instructions and a memory (216/806/906) for storing data and instructions of the respective device. The memories (216/806/906) may individually include volatile random-access memory (RAM), non-volatile read only memory (ROM), non-volatile magnetoresistive (MRAM) memory, and/or other types of memory. Each device may also include a data-storage component (708/808/908), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (212/802/902).

Computer instructions for operating each device (110*a*/110*b*/112/120) and its various components may be executed by the respective device's controller(s)/processor(s) (214/804/904), using the memory (216/806/906) as temporary "working" storage at runtime. The processor(s) 214 may include the first transceiver 302, the DSP 304, and/or the second transceiver 306. A device's computer instructions may be stored in a non-transitory manner in non-volatile memory (216/806/906), storage (708/808/908), or an external device(s). Alternatively, some or all of the executable instructions may be embedded in hardware or firmware on the respective device in addition to or instead of software.

Each device (110*a*/110*b*/112/120) includes input/output device interfaces (212/802/902). A variety of components may be connected through the input/output device interfaces, as will be discussed further below. Additionally, each device (110*a*/110*b*/112/120) may include an address/data bus (724/824/924) for conveying data among components of the respective device. Each component within a device (110*a*/110*b*/112/120) may also be directly connected to other components in addition to (or instead of) being connected to other components across the bus (724/824/924).

For example, via the antenna 210/814, the input/output device interfaces 212/702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 2G network, etc. A wired connection such as Ethernet may also be supported. Through the network(s) 199, the speech processing system may be distributed across a networked environment.

Referring to the device 110*a*/110*b*/112 of FIGS. 7 and 8, the device 110*a*/110*b*/112 may also include input/output device interfaces 212/802 that connect to a variety of components, such as an audio output component like a loudspeaker 202/860 or other component capable of outputting audio. The device 110*a*/110*b*/112 may also include an audio capture component which may be, for example, a microphone 204/850 or array of microphones. The microphone 750/850 may be configured to capture audio. The microphones 204a and 204b may be used to determine an approximate distance to a sound's point of origin; acoustic localization, based on time and/or amplitude differences between sounds captured by different microphones of the array, i.e., beam forming, may be performed. The device 110a/110b/112 (using microphone 204/850) may be configured to determine audio data corresponding to detected audio. The device 110a/110b/112 (using input/output device interfaces 212/702, antenna 210/714, etc.) may also be configured to transmit the audio data to server 120 for further processing or to process the data using internal components. As a way of indicating to a user that a wireless connection to another device has been created, the device 110a/110b/112 may be configured with a visual indicator, such as an LED or similar component (not illustrated), that may change color, flash, or otherwise provide visual indications by the device 110a/110b/112. The device 112 may include a display 718, which may comprise a touch interface 719.

The device 110a/110b may include a wakeword detection component. The wakeword detection component receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110a/110b may be configured collectively to identify a set of the directional audio signals in which the wake expression is detected or in which the wake expression is likely to have occurred.

The wakeword detection component receives captured audio and processes the audio to determine whether the audio corresponds to particular keywords recognizable by the device 110a/110b. The storage 708 may store data relating to keywords and functions to enable the wakeword detection component to perform the algorithms and methods described above. The locally stored speech models may be pre-configured based on known information, prior to the device 110a/110b being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110a/110b prior to the user device 110a/110b being delivered to the user or configured to access the network by the user. The wakeword detection component may access the storage 708 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and server 120, as illustrated in FIGS. 7, 8, and 9, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

Figure 10:
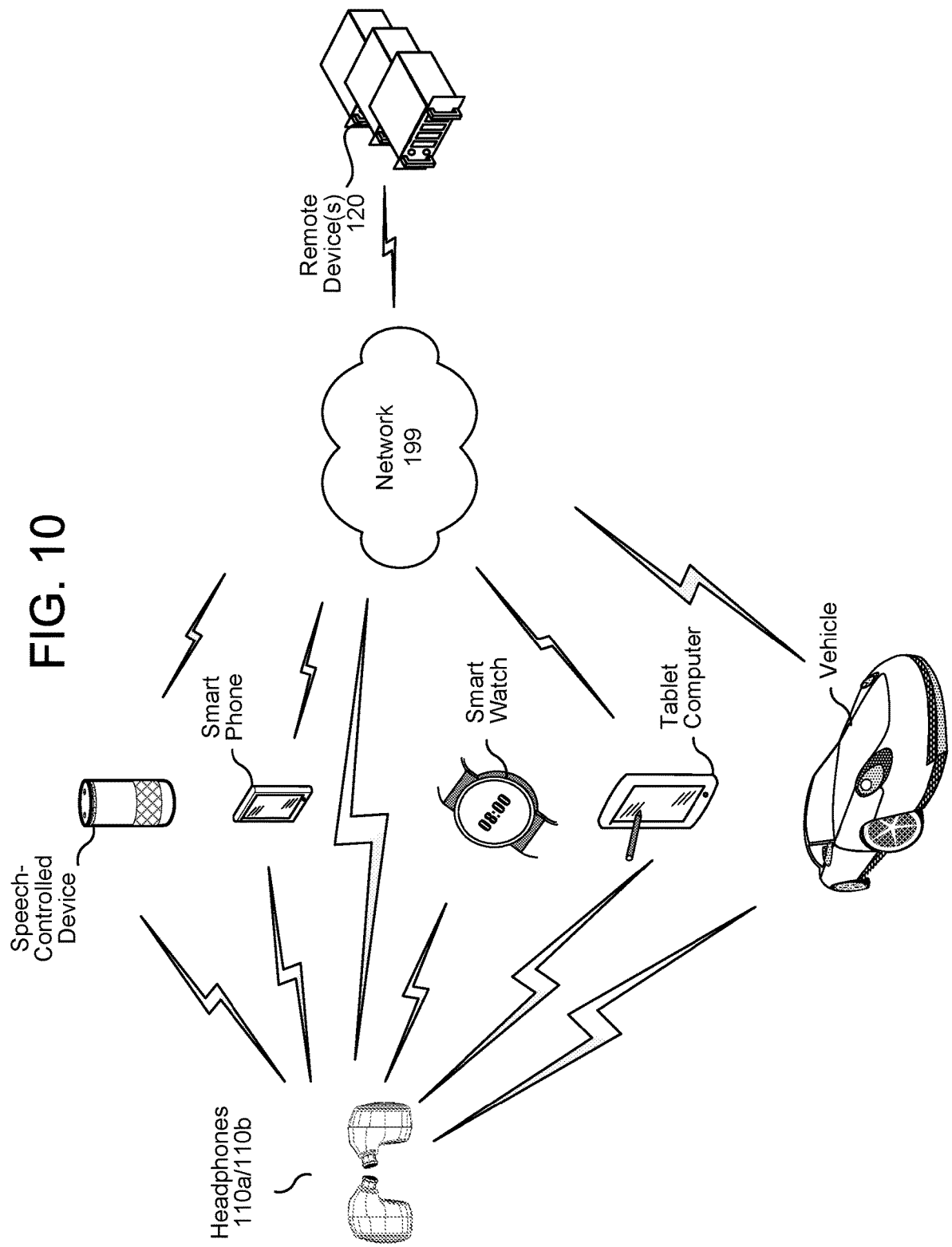
FIG. 10 illustrates an example of a computer network for use with the device provisioning system.

As illustrated in FIG. 10 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices. The headphones 110a/110b may capture audio using one or more microphones or other such audio-capture devices; the headphones 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   establishing, by a first audio-output device, a first wireless connection with a second audio-output device;
   establishing, by the first audio-output device, a second wireless connection with a user device;
   receiving, by the first audio-output device from the user device, first audio data;
   determining, by the first audio-output device, an amount of time corresponding to sending, to the second audio-output device, at least a portion of the first audio data;
   sending, by the first audio-output device to the second audio-output device, time data corresponding to the amount of time;
   disconnecting, by the first audio-output device, the second wireless connection; and
   after disconnecting the second wireless connection, sending, by the first audio-output device to the second audio-output device, at least the portion of the first audio data.

2. The computer-implemented method of claim 1, further comprising:
   receiving, at the second audio-output device, the time data;
   establishing, by the second audio-output device, a third wireless connection with the user device;
   receiving, at the second audio-output device, at least the portion of the first audio data; and
   prior to the amount of time elapsing, causing output of first audio corresponding to at least the portion of the first audio data.

3. The computer-implemented method of claim 1, further comprising:
   receiving, at the second audio-output device from the user device, second audio data; and
   after the amount of time has elapsed, causing output of second audio corresponding to the second audio data.

4. The computer-implemented method of claim 1, further comprising:
   after determining, by the first audio-output device, to disconnect the second wireless connection and prior to disconnecting the second wireless connection, receiving, from the user device, second audio data;
   determining, by the first audio-output device, a second amount of time required for sending, to the second audio-output device, at least the portion of the first audio data and the second audio data;
   sending, to the second audio-output device, the second amount of time; and
   establishing, by the second audio-output device after the second amount of time has elapsed, a third wireless connection with the user device.

5. The computer-implemented method of claim 1, further comprising:
   after determining, by the first audio-output device, to disconnect the second wireless connection, determining a second amount of time representing a difference between a time of disconnecting the second wireless connection and a current time;
   determining, by the first audio-output device, a third amount of time corresponding to sending, to the second audio-output device, at least the portion of the first audio data and the second amount of time;
   sending, to the second audio-output device, the third amount of time; and
   establishing, by the second audio-output device after the third amount of time has elapsed, a third wireless connection with the user device.

6. The computer-implemented method of claim 1, wherein determining the amount of time comprises:
   determining, by the first audio-output device, a first number of packets stored in a packet buffer of the first audio-output device;
   determining, by the first audio-output device, a second number of packets stored in a media buffer of the first audio-output device;
   determining, by the first audio-output device, a second amount of time by multiplying a sum of the first number of packets and the second number of packets with a third amount of time required for sending a single packet;
   determining, by the first audio-output device, a fourth amount of time required for the second audio-output device to establish a third wireless connection with the user device; and
   subtracting the fourth amount of time from the second amount of time.

7. The computer-implemented method of claim 1, wherein determining the amount of time comprises:
   determining, by the first audio-output device, a second amount of time corresponding to a latency in sending, to the second audio-output device, the at least the portion of the first audio data;
   generating, using a delay buffer of the first audio-output device, second audio data representing the first audio data delayed by the second amount of time; and
   outputting, by the first audio-output device, audio corresponding to the second audio data.

8. The computer-implemented method of claim 1, further comprising, prior to disconnecting the second wireless connection:
   determining, by the first audio-output device, a first signal quality metric of the second wireless connection;
   receiving, by the first audio-output device from the second audio-output device, a second signal quality metric; and determining, by the first audio-output device, that the second signal quality metric indicates a higher signal quality than the first signal quality metric.

9. The computer-implemented method of claim 1, further comprising:
receiving, by the second audio-output device from the user device, at least a second portion of the first audio data; and
after receiving, by the second audio-output device, the time data, sending, by the second audio-output device to the first audio-output device, an indication of at least the second portion of the first audio data,
wherein the at least the portion of the first audio data does not include at least the second portion of the first audio data.

10. The computer-implemented method of claim 9, further comprising:
receiving, by the first audio-output device, the indication of at least the second portion of the first audio data;
determining, by the first audio-output device, a second amount of time corresponding to sending, to the second audio-output device, at least the portion of the first audio data that omits at least the second portion of the first audio data; and
sending, by the first audio-output device to the second audio-output device, second time data corresponding to the second amount of time.

11. The computer-implemented method of claim 1, wherein the first audio-output device comprises a wireless earbud.

12. A system comprising:
at least one processor; and
at least one memory including instructions that, when executed by the at least one processor, cause the system to:
establish, by a first audio-output device, a first wireless connection with a second audio-output device;
establish, by the first audio-output device, a second wireless connection with a user device;
receive, by the first audio-output device from the user device, first audio data;
determine, by the first audio-output device, an amount of time corresponding to sending, to the second audio-output device, at least a portion of the first audio data;
send, by the first audio-output device to the second audio-output device, time data corresponding to the amount of time;
disconnect, by the first audio-output device, the second wireless connection; and
after disconnecting the second wireless connection, send, by the first audio-output device to the second audio-output device, at least the portion of the first audio data.

13. The system of claim 12, wherein the at least one memory further includes instructions that, when executed by the at least one processor, further cause the system to:
receive, at the second audio-output device, the time data;
establish, by the second audio-output device, a third wireless connection with the user device;
receive, at the second audio-output device, at least the portion of the first audio data; and
prior to the amount of time elapsing, cause output of first audio corresponding to at least the portion of the first audio data.

14. The system of claim 12, wherein the at least one memory further includes instructions that, when executed by the at least one processor, further cause the system to:
receive, at the second audio-output device from the user device, second audio data; and
after the amount of time has elapsed, cause output of second audio corresponding to the second audio data.

15. The system of claim 12, wherein the at least one memory further includes instructions that, when executed by the at least one processor, further cause the system to:
after determining, by the first audio-output device, to disconnect the second wireless connection and prior to disconnecting the second wireless connection, receive, from the user device, second audio data;
determine, by the first audio-output device, a second amount of time required for sending, to the second audio-output device, at least the portion of the first audio data and the second audio data;
send, to the second audio-output device, the second amount of time; and
establish, by the second audio-output device after the second amount of time has elapsed, a third wireless connection with the user device.

16. The system of claim 12, wherein the at least one memory further includes instructions that, when executed by the at least one processor, further cause the system to:
after determining, by the first audio-output device, to disconnect the second wireless connection, determine a second amount of time representing a difference between a time of disconnecting the second wireless connection and a current time;
determine, by the first audio-output device, a third amount of time corresponding to sending, to the second audio-output device, at least the portion of the first audio data and the second amount of time;
send, to the second audio-output device, the third amount of time; and
establish, by the second audio-output device after the third amount of time has elapsed, a third wireless connection with the user device.

17. The system of claim 12, wherein the at least one memory further includes instructions that, when executed by the at least one processor, further cause the system to:
determine, by the first audio-output device, a first number of packets stored in a packet buffer of the first audio-output device;
determine, by the first audio-output device, a second number of packets stored in a media buffer of the first audio-output device;
determine, by the first audio-output device, a second amount of time by multiplying a sum of the first number of packets and the second number of packets with a third amount of time required for sending a single packet;
determine, by the first audio-output device, a fourth amount of time required for the second audio-output device to establish a third wireless connection with the user device; and
subtract the fourth amount of time from the second amount of time.

18. The system of claim 12, wherein the at least one memory further includes instructions that, when executed by the at least one processor, further cause the system to:
determine, by the first audio-output device, a second amount of time corresponding to a latency in sending, to the second audio-output device, the at least the portion of the first audio data;

generate, using a delay buffer of the first audio-output device, second audio data representing the first audio data delayed by the second amount of time; and output, by the first audio-output device, audio corresponding to the second audio data.

19. The system of claim 12, wherein the at least one memory further includes instructions that, when executed by the at least one processor, further cause the system to:

receive, by the second audio-output device from the user device, at least a second portion of the first audio data; and after receiving, by the second audio-output device, the time data, send, by the second audio-output device to the first audio-output device, an indication of at least the second portion of the first audio data, wherein the at least the portion of the first audio data does not include at least the second portion of the first audio data.

20. The system of claim 12, wherein the first audio-output device comprises a wireless earbud.

* * * * *